(12) United States Patent
Yamada et al.

(10) Patent No.: US 9,152,845 B2
(45) Date of Patent: Oct. 6, 2015

(54) HUMAN ATTRIBUTE ESTIMATION SYSTEM, HUMAN ATTRIBUTE ESTIMATION APPARATUS AND HUMAN ATTRIBUTE ESTIMATION METHOD

(75) Inventors: Shin Yamada, Kanagawa (JP); Jun Nishimura, Kanagawa (JP); Hiroaki Yoshio, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 84 days.

(21) Appl. No.: 14/117,401

(22) PCT Filed: May 31, 2012

(86) PCT No.: PCT/JP2012/003608
§ 371 (c)(1),
(2), (4) Date: Nov. 13, 2013

(87) PCT Pub. No.: WO2012/164950
PCT Pub. Date: Dec. 6, 2012

(65) Prior Publication Data
US 2014/0334718 A1    Nov. 13, 2014

(30) Foreign Application Priority Data
Jun. 2, 2011 (JP) .................. 2011-124424

(51) Int. Cl.
*G06K 9/00* (2006.01)
*G06T 7/20* (2006.01)
(Continued)

(52) U.S. Cl.
CPC ........ *G06K 9/00221* (2013.01); *G06K 9/00268* (2013.01); *G06K 9/00362* (2013.01);
(Continued)

(58) Field of Classification Search
CPC ............ G06K 9/00362; G06K 9/4661; G06K 9/6218; G06K 9/6201; G06K 9/00268; G06K 9/00221; G06K 2009/00322; G06T 7/20
See application file for complete search history.

(56) References Cited

U.S. PATENT DOCUMENTS 5,802,220 A * 9/1998 Black et al. .................... 382/276
5,850,470 A * 12/1998 Kung et al. .................... 382/157
(Continued)

FOREIGN PATENT DOCUMENTS

| JP | 2003-316746 | 11/2003 |
| JP | 2004-054376 | 2/2004 |
| JP | 2011-514994 | 5/2011 |

OTHER PUBLICATIONS

International Search Report (ISR) in International Patent Application No. PCT/JP2012/003608, dated Nov. 7, 2012.
(Continued)

*Primary Examiner* — Manav Seth
(74) *Attorney, Agent, or Firm* — Greenblum & Bernstein, P.L.C.

(57) ABSTRACT

To provide a human attribute estimation system capable of improving estimation accuracy irrespective of an environment-dependent attribute is provided. An age/gender estimation system as a human attribute estimation system is provided with: a monitoring camera photographing a human targeted by attribute estimation and generating an image; an age/gender estimating section estimating an attribute of the human shown in the image generated by the monitoring camera using an estimation parameter; and an environment-dependent attribute specifying section specifying an environment-dependent attribute, which is an attribute dependent on an installation environment of the monitoring camera. The age/gender estimating section uses a parameter generated on the basis of learning data having an environment-dependent attribute within a predetermined distance from the environment-dependent attribute acquired by the environment-dependent attribute specifying section in an environment-dependent attribute space, as the estimation parameter.

5 Claims, 28 Drawing Sheets

(51) Int. Cl.
*G06K 9/46* (2006.01)
*G06K 9/62* (2006.01)

(52) U.S. Cl.
CPC ............ *G06K9/4661* (2013.01); *G06K 9/6201* (2013.01); *G06K 9/6218* (2013.01); *G06T 7/20* (2013.01); *G06K 2009/00322* (2013.01)

(56) References Cited

U.S. PATENT DOCUMENTS

| | | | | |
|---|---|---|---|---|
| 6,888,955 | B2* | 5/2005 | Masumoto et al. | 382/118 |
| 7,593,551 | B2* | 9/2009 | Kamei | 382/118 |
| 7,715,599 | B2* | 5/2010 | Hiraizumi et al. | 382/118 |
| 7,760,933 | B2* | 7/2010 | Nagao et al. | 382/159 |
| 7,804,997 | B2* | 9/2010 | Geng et al. | 382/154 |
| 2001/0038714 | A1* | 11/2001 | Masumoto et al. | 382/209 |
| 2005/0286764 | A1* | 12/2005 | Mittal et al. | 382/181 |
| 2009/0220153 | A1* | 9/2009 | Hall et al. | 382/181 |
| 2013/0010095 | A1 | 1/2013 | Aoki et al. | |
| 2013/0129160 | A1 | 5/2013 | Yamada et al. | |
| 2013/0308825 | A1 | 11/2013 | Yamazaki | |

OTHER PUBLICATIONS

Meltem Demirkus et al., "Automated person categorization for video surveillance using soft biometrics", Proceedings of SPIE, vol. 7667, Apr. 5, 2010, pp. 76670P-1-12.

Simon Denman et al., "Soft-Biometrics: Unconstrained Authentication in a Surveillance Environment", Digital Image Computing: Techniques and Applications, 2009, Dec. 1, 2009, pp. 196-203.

De Zhang et al., "Gender Recognition Based on Fusion of Face and Multi-view Gait", Advances in Biometrics, Jun. 2, 2009, pp. 1010-1018.

Fabian Nater et al., "Exploiting Simple Hierarchies for Unsupervised Human Behavior Analysis", 2010 IEEE Conference on Computer Vision and Pattern Recognition (CVPR), Jun. 13-18, 2010, pp. 2014-2021.

Office Action from Japan Patent Office (JPO) in Japanese Patent Application No. 2011-124424, dated May 19, 2015.

Murase, H., "Generative Learning for Image Recognition", Journal of Information Processing Society of Japan, vol. 46, No. SIG15CVIM1, pp. 35-42 (Oct. 15, 2005,) along with a partial English language translation thereof.

* cited by examiner

HUMAN ATTRIBUTE ESTIMATION SYSTEM, HUMAN ATTRIBUTE ESTIMATION APPARATUS AND HUMAN ATTRIBUTE ESTIMATION METHOD

TECHNICAL FIELD

The present invention relates to a human attribute estimation system, human attribute estimation apparatus and human attribute estimation method for estimating attributes (for example, age and gender of a human from an image of the human, and in particular to a human attribute estimation system, human attribute estimation apparatus and human attribute estimation method for estimating attributes of a human using estimation parameters based on learning.

BACKGROUND ART

Conventionally, there has been known a human attribute estimation system in a store such as a convenience store which photographs a customer and estimates the attributes of the customer from an image to analyze the type of the customer. FIG. 28 is a diagram showing the configuration of a conventional human attribute estimation system. This human attribute estimation system is an age/gender estimation system for estimating age and gender as attributes of a human. As shown in FIG. 28, the age/gender estimation system 50 is constituted by a monitoring camera 51 and an age/gender estimation apparatus 52.

The monitoring camera 51 is installed, for example, near the entrance of a store to take a video which includes the face of a customer who enters the store. The age/gender estimation apparatus 52 is provided with a face detecting section 521, an age/gender estimating section 522 and an estimation parameter storing section 523. The face detecting section 521 detects a face from each frame image of the video taken by the monitoring camera 51. The age/gender estimating section 522 estimates the age and gender for the face detected by the face detecting section 521. The estimation parameter storing section 523 stores parameters (models or the like) used when age and gender are estimated by the age/gender estimating section 522.

In the age/gender estimation system 50, the monitoring camera 51 takes a video which includes the face of a customer, the face detecting section 521 detects a face from each frame image of the taken video, and the age/gender estimating section 522 estimates the age and gender of the photographed human using the parameters stored in the estimation parameter storing section 523.

In the estimation parameter storing section 523, estimation parameters created in advance when the age/gender estimation system 50 was manufactured and shipped (hereinafter referred to as "initial estimation parameters") are stored. The initial estimation parameters were calculated on the basis of multiple learning images taken in an experimental laboratory. When the age/gender estimation systems 50 are sold as products, the same initial estimation parameters are stored in the estimation parameter storing sections 523 of all of the age/gender estimation systems 50.

As a prior-art technique document which discloses a technique related to the present invention, the following document exists.

CITATION LIST

Patent Literature

[Patent Literature 1] Japanese Patent Laid-Open No. 2004-054376

SUMMARY OF INVENTION

Technical Problem

However, there is a problem that, when the age/gender estimation system 50 is introduced into an actual store and the monitoring camera 51 is installed at a predetermined position in the store, the accuracy decreases in comparison with the case where age/gender estimation is performed for an image taken in an experimental laboratory. It is conceived to be a factor of the accuracy decrease that initial estimation parameters calculated on the basis of multiple learning images taken in an experimental laboratory are used. However, there is not known a method of preparing learning images effective in all stores in advance and setting initial estimation parameters.

The present invention has been made to solve the above problem, and its objective is to provide a human attribute estimation system, human attribute estimation apparatus and human attribute estimation method capable of improving the accuracy of estimation irrespective of the installation environment of the monitoring camera 51.

Solution to Problem

In order to solve the above conventional problem, a human attribute estimation system of the present invention is configured to include: a camera photographing a human targeted by attribute estimation and generating an image; an attribute estimating section estimating an attribute of the human shown in the image generated by the camera using an estimation parameter; and an environment-dependent attribute acquiring section acquiring an environment-dependent attribute, which is an attribute dependent on an installation environment of the camera; wherein the attribute estimating section uses a parameter generated on the basis of learning data having an environment-dependent attribute within a predetermined distance from the environment-dependent attribute acquired by the environment-dependent attribute acquiring section in an environment-dependent attribute space, as the estimation parameter.

Furthermore, a human attribute estimation apparatus of the present invention is configured to be connected to a camera photographing a human targeted by attribute estimation and generating an image, and include: an attribute estimating section estimating an attribute of the human shown in the image generated by the camera using an estimation parameter; and an environment-dependent attribute acquiring section acquiring an environment-dependent attribute, which is an attribute dependent on an installation environment of the camera; wherein the attribute estimating section uses a parameter obtained with the use of learning data having an environment-dependent attribute within a predetermined distance from the environment-dependent attribute acquired by the environment-dependent attribute acquiring section in an environment-dependent attribute space, as the estimation parameter.

Advantageous Effect of Invention

According to the present invention, an estimation parameter is generated on the basis of learning data having an environment-dependent attribute close to the environment-dependent attribute of a camera, and an attribute of a human is estimated with the use of this estimation parameter. Therefore, it is possible to improve estimation accuracy irrespective of an environment-dependent attribute.

As described hereunder, other aspects of the present invention exist. Therefore, this disclosure of the invention is intended to provide some aspects of the present invention, and is not intended to limit the scope of the invention as described and claimed herein.

DESCRIPTION OF EMBODIMENTS

Figure 1:
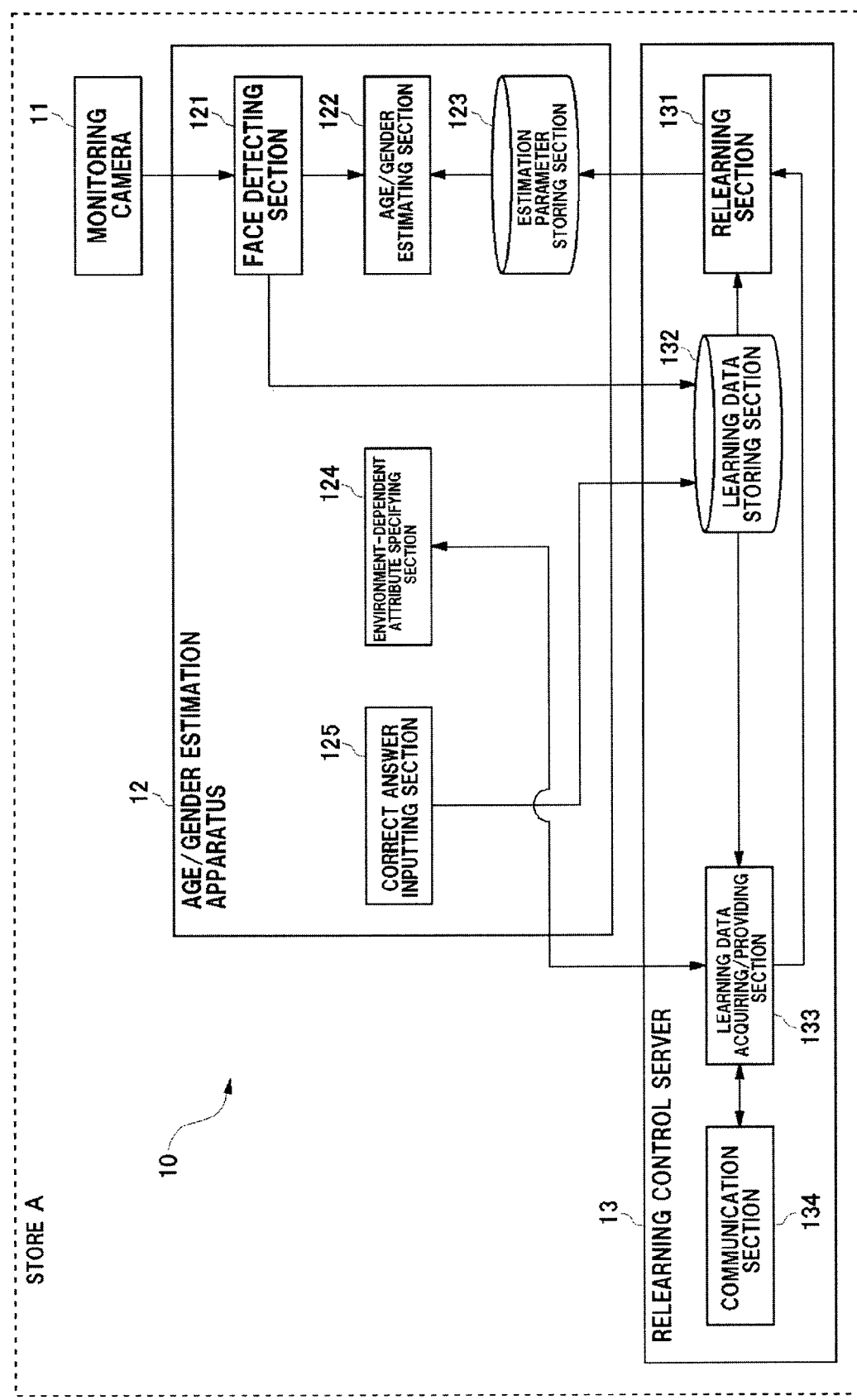
FIG. 1 is a diagram showing the configuration of an age/gender estimation system in a first embodiment of the present invention.

This invention is described in detail hereunder. The embodiments described hereunder are merely examples of the present invention, and the present invention can be changed in various forms. Accordingly, the specific configurations and functions described below are not intended to limit the scope of the claims.

A human attribute estimation system according to an embodiment of the present invention is configured to include: a camera photographing a human targeted by attribute estimation and generating an image; an attribute estimating section estimating an attribute of a human shown in the image generated by the camera using an estimation parameter; and an environment-dependent attribute acquiring section acquiring an environment-dependent attribute, which is an attribute dependent on an installation environment of the camera; wherein the attribute estimating section uses a parameter generated on the basis of learning data having an environment-dependent attribute within a predetermined distance from the environment-dependent attribute acquired by the environment-dependent attribute acquiring section in an environment-dependent attribute space, as the estimation parameter.

According to this configuration, an estimation parameter is generated on the basis of learning data having an environment-dependent attribute close to the environment-dependent attribute of a camera, and an attribute of a human is estimated with the use of this estimation parameter. Therefore, it is possible to improve estimation accuracy irrespective of an environment-dependent attribute. Here, the environment-dependent attribute is a factor which depends on the installation environment of a camera and influences estimation accuracy. As environment-dependent attribute differences, there are, for example, a difference in the state of illumination (the direction of an illumination source, the intensity of illumination, and the like), a difference in the vertical/horizontal direction of a face (for example, the case where learning images at the time of calculating an initial estimation parameter are only frontal images while images taken by an installed camera are those in a diagonal direction), a difference in the size of the face in an image (the resolution of the face), and the like. When human attribute estimation systems are introduced into multiple stores, respectively, it is difficult, according to conventional techniques, to prepare effective learning images in all the stores in advance and set initial estimation parameters because the environment-dependent attribute described above differs among the stores. In comparison, according to this configuration, it is possible to generate and use an estimation parameter appropriate for the installation environment of each camera.

The above human attribute estimation system may further include a relearning section generating the estimation parameter on the basis of learning data having the environment-dependent attribute within the predetermined distance from the environment-dependent attribute acquired by the environment-dependent attribute acquiring section in the environment-dependent attribute space, and the attribute estimating section may use the estimation parameter generated by the relearning section.

According to this configuration, it is possible for the human attribute estimation system itself to generate an estimation parameter.

Furthermore, in the above human attribute estimation system, the environment-dependent attribute acquiring section may acquire the environment-dependent attribute by accepting specification of the environment-dependent attribute by a user.

According to this configuration, it is possible for a user to specify an environment-dependent attribute.

Furthermore, in the above human attribute estimation system, the environment-dependent attribute acquiring section may acquire the environment-dependent attribute by estimating the environment-dependent attribute on the basis of the image generated by the camera.

According to this configuration, it is possible to automatically acquire an environment-dependent attribute on the basis of an image generated by a camera.

The above human attribute estimation system may be communicably connected to another human attribute estimation system and may further include a learning data acquiring section acquiring the learning data having the environment-dependent attribute within the predetermined distance from the environment-dependent attribute acquired by the environment-dependent attribute acquiring section in the environment-dependent attribute space, from the other human attribute estimation system via communication, and the relearning section may generate the estimation parameter using the learning data acquired by the learning data acquiring section.

According to this configuration, it is possible to acquire learning data from another human attribute estimation system and generate an estimation parameter on the basis of the learning data. Thereby, even when a camera is newly installed, it is possible to acquire estimation parameters corresponding to its environment-dependent attribute before start of operation and generate an estimation parameter appropriate for the environment of the camera.

Furthermore, the above human attribute estimation system may include: a plurality of the cameras; multiple human attribute estimation apparatuses connected to the plurality of cameras, respectively, and each of the multiple human attribute estimation apparatuses comprising at least the attribute estimating section and the environment-dependent attribute acquiring section; and a parameter distribution server communicably connected to multiple human attribute estimation apparatuses and providing the estimation parameter used by the attribute estimating section to the human attribute estimation apparatuses via communication.

According to this configuration, it is possible to provide an estimation parameter appropriate for each camera from a parameter distribution server, and a configuration for generating the estimation parameter is not required at the installation place of each camera.

Furthermore, the above human attribute estimation system may include: a correct answer inputting section accepting, for the image generated by the camera, input of correct answer information about the attribute of the human from the user; and a learning data storing section storing learning data including the image generated by the camera, the environment-dependent attribute about the image acquired by the environment-dependent attribute acquiring section, and the correct answer information about the image inputted by the correct answer inputting section.

According to this configuration, it is possible to, after operation is started at the installation place of each of a plurality of cameras, provide learning data for updating an estimation parameter to the installation place of another camera (especially another camera newly installed later).

Further, the above human attribute estimation system may include: a plurality of the cameras, and an environment-dependent attribute space generating section that generates the environment-dependent attribute space based on images generated by each of the plurality of cameras.

According to this configuration, since an environment-dependent attribute space is generated that is based on images generated by each of a plurality of cameras, an environment-dependent attribute space is generated which reflects a photographing environment of the respective cameras, and since learning data for generating an estimation parameter can be determined in such kind of environment-dependent attribute space, it is possible to extract learning data in which photographing environments are similar from multiple images generated by other cameras.

Furthermore, in the above human attribute estimation system, the environment-dependent attribute space generating section may generate the environment-dependent attribute space based on a mean and a covariance of feature values of multiple images generated by each of the plurality of cameras.

According to this configuration, since it is possible to generate an environment-dependent attribute space that distinctly represents a photographing environment of a camera, learning data in which a photographing environment is similar to each other can be accurately extracted.

Further, the above human attribute estimation system may include: a representative sample extracting section that, among multiple images generated by a single camera among the plurality of cameras, extracts a representative sample that represents a photographing environment of the single camera in the environment-dependent attribute space generated by the environment-dependent attribute space generating section; and a similar learning data extracting section that extracts the learning data from multiple images generated by a camera other than the single camera among the plurality of cameras based on a distance in the environment-dependent attribute space generated by the environment-dependent attribute space generating section between multiple images generated by a camera other than the single camera among the plurality of cameras and the representative sample.

According to this configuration, since a similarity/dissimilarity between a representative sample of a single camera and an image of another camera is determined with respect to an environment-dependent attribute space in which the photographing environment of the camera is reflected, the calculation load for extracting learning data that is similar to the representative sample can be reduced.

Furthermore, a human attribute estimation apparatus according to an embodiment of the present invention is configured to be connected to a camera photographing a human targeted by attribute estimation and generating an image, and include: an attribute estimating section estimating an attribute of the human shown in the image generated by the camera using an estimation parameter; and an environment-dependent attribute acquiring section acquiring an environment-dependent attribute, which is an attribute dependent on an installation environment of the camera; wherein the attribute estimating section uses a parameter obtained with the use of learning data having an environment-dependent attribute within a predetermined distance from the environment-dependent attribute acquired by the environment-dependent attribute acquiring section in an environment-dependent attribute space, as the estimation parameter.

According to this configuration also, an estimation parameter is generated on the basis of learning data having an environment-dependent attribute close to the environment-dependent attribute of a camera, and an attribute of a human is estimated with the use of this estimation parameter. Therefore, it is possible to improve estimation accuracy irrespective of an environment-dependent attribute.

Embodiments for practicing the present invention will be described below with reference to drawings. The present invention relates to a human attribute estimation system and human attribute estimation method for estimating an attribute of a human. In the embodiments below, an age/gender estimation system and age/gender estimation method for estimating the age and gender of a human as attributes of the human will be described.

[First Embodiment]

FIG. 1 is a diagram showing the configuration of an age/gender estimation system of a first embodiment of the present invention. An age/gender estimation system 10 is installed in a store A. The age/gender estimation system 10 is provided with a monitoring camera 11, an age/gender estimation apparatus 12 and a relearning control server 13.

Figure 2:
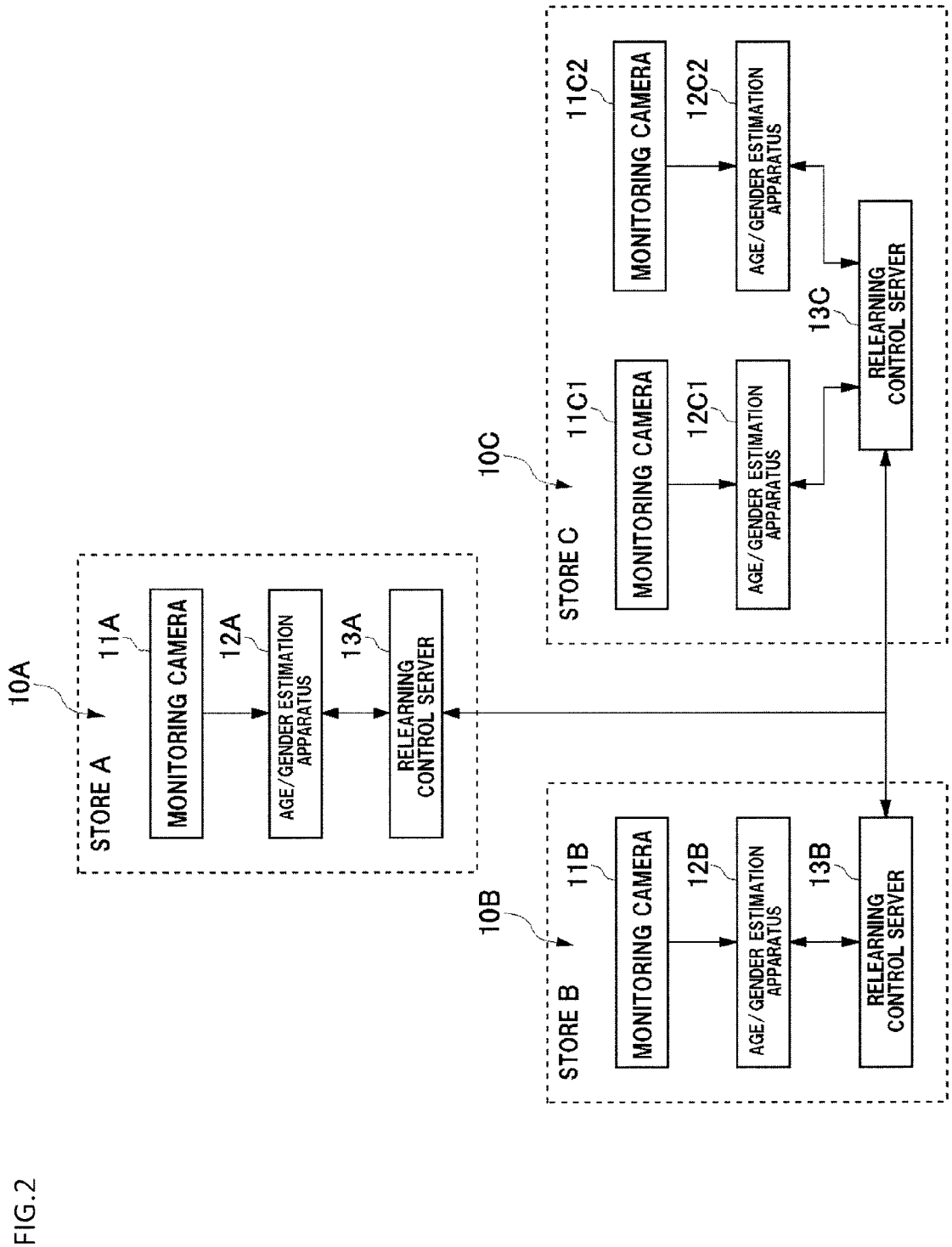
FIG. 2 is a diagram showing the configuration of a cooperation system which includes the multiple age/gender estimation system in the first embodiment of the present invention.

FIG. 2 is a diagram showing the configuration of a cooperation system in which multiple age/gender estimation systems are connected via a communication network. The cooperation system shown in FIG. 2 is configured by connecting an age/gender estimation system 10A installed in a store A, an age/gender estimation system 10B installed in a store B, and an age/gender estimation system 100 installed in a store C.

The age/gender estimation system 10A is provided with a monitoring camera 11A, an age/gender estimation apparatus 12A and a relearning control server 13A, and the age/gender estimation system 10B is provided with a monitoring camera 11B, an age/gender estimation apparatus 12B and a relearning control server 13B. The age/gender estimation system 100 is provided with monitoring cameras 11C1 and 11C2, age/gender estimation apparatuses 12C1 and 12C2, and a relearning control server 13C. That is, the age/gender estimation system 100 is provided with two monitoring cameras and two age/gender estimation apparatuses. The age/gender estimation system 10 in FIG. 1 shows the configuration of the age/gender estimation system 10A and the age/gender estimation system 10B in FIG. 2.

By cooperating with the other age/gender estimation systems, the age/gender estimation system 10 acquires learning data of another age/gender estimation system and performs relearning. Especially, a newly installed age/gender estimation system can obtain a learning effect immediately after its installation (before start of its operation) by acquiring learning data from another age/gender estimation system having an environment-dependent attribute close to that of the newly installed age/gender estimation system in estimation of age and gender.

That is, when a new age/gender estimation system is installed in the case where the cooperation with the other age/gender estimation systems does not exist, it cannot improve estimation accuracy by updating estimation parameters so as to fit to the installation environment of its monitoring camera, unless it performs relearning using images taken by its monitoring camera as learning images. However, the age/gender estimation system 10 of this embodiment can perform relearning so as to fit to the installation environment of its monitoring camera immediately after being installed, by cooperating with the other age/gender estimation systems.

Each of the age/gender estimation systems constituting the cooperation system performs relearning (the first learning has been performed with the use of learning images taken in an experimental laboratory environment in order to set initial estimation parameters) using a learning result of an existing age/gender estimation system when it is newly installed, and the age/gender estimation system itself generates learning data so as to provide the learning data for other age/gender estimation systems newly installed later, after its operation is started.

In the case where there are a sufficient number of existing age/gender estimation systems in the cooperation system, and it is not necessary for a newly installed age/gender estimation system itself to provide learning data, the newly installed age/gender estimation system may be such that does not have a configuration for the age/gender estimation system itself to generate learning data. It goes without saying that the age/gender estimation system may perform relearning using learning data generated by the age/gender estimation system itself after operation is started.

The configuration of the age/gender estimation system 10 will be described in detail with reference to FIG. 1. A configuration of the age/gender estimation system 10 for estimating age and gender will be described below. As for relearning, a configuration for performing relearning using a learning result of another existing age/gender estimation system and a configuration for generating learning data for relearning by other age/gender estimation systems newly installed later will be described separately.

(Configuration for Estimating Age and Gender)

The monitoring camera 11 is installed so that it photographs a place where an unspecified large number of humans whose age and gender are to be estimated (humans targeted by attribute estimation) come. For example, the monitoring camera 11 is installed at a high position inside a store so as to photograph the face of a customer who comes from the entrance of the store. The monitoring camera 11 takes a video and generates continuous frame images or takes still images at predetermined time intervals, and outputs them to the age/gender estimation apparatus 12.

The age/gender estimation apparatus 12 is provided with a face detecting section 121, an age/gender estimating section 122, an estimation parameter storing section 123 and an environment-dependent attribute specifying section 124. The face detecting section 121 detects an area of the face of a human from an image acquired by the monitoring camera 11 and outputs the image of the face area (hereinafter referred to as a "face image") to the age/gender estimating section 122. The face detecting section 121 detects a face in accordance with an existing method (for example, a neural network or boosting) using prepared parameters (models).

For the face image detected by the face detecting section 121, the age/gender estimating section 122 estimates the age and gender of the face. At this time, the age/gender estimating section 122 performs estimation of the age and gender in accordance with an existing method (for example, linear discriminant analysis) using estimation parameters stored in the estimation parameter storing section 123.

In the estimation parameter storing section 123, there are stored estimation parameters used for estimation by the age/gender estimating section 122. In the estimation parameter storing section 123, estimation parameters obtained as a result of performing learning using images obtained in a predetermined environment (for example, an experimental laboratory environment) as learning images are stored as initial estimation parameters. Therefore, if, after the monitoring camera 11 is installed, an environment-dependent attribute at the time of the monitoring camera 11 performing photographing is close to the environment-dependent attribute at the time of taking learning images to generate the initial estimation parameters, it is possible to perform estimation of age and gender at a relatively high accuracy even if the estimation is performed with the use of the initial estimation parameters (without relearning).

However, if the environment-dependent attribute at the time of the installed monitoring camera 11 performing photographing and the environment-dependent attribute at the time of taking learning images to generate the initial parameters do not correspond to each other, it is impossible to perform estimation at a high accuracy even if the estimation is performed with the use of the initial estimation parameters stored in the estimation parameter storing section 123. Therefore, the age/gender estimation system 10 of this embodiment has a function of performing relearning for the estimation parameters stored in the estimation parameter storing section 123.

(Configuration for Performing Relearning Using Learning Result of Another Existing Age/Gender Estimation System)

The environment-dependent attribute specifying section 124 receives specification of an environment-dependent attribute of the monitoring camera 11 and stores it. In this embodiment, the environment-dependent attribute is a face direction (in horizontal and vertical directions) relative to the monitoring camera 11 when a human to be photographed is facing front. When installing the monitoring camera 11, a user specifies the direction of the face of a human facing front relative to the monitoring camera 11 as an environment-dependent attribute, by inputting an angle in the horizontal direction and an angle in the vertical direction to the environment-dependent attribute specifying section 124 according to the installation state.

Figure 3A:
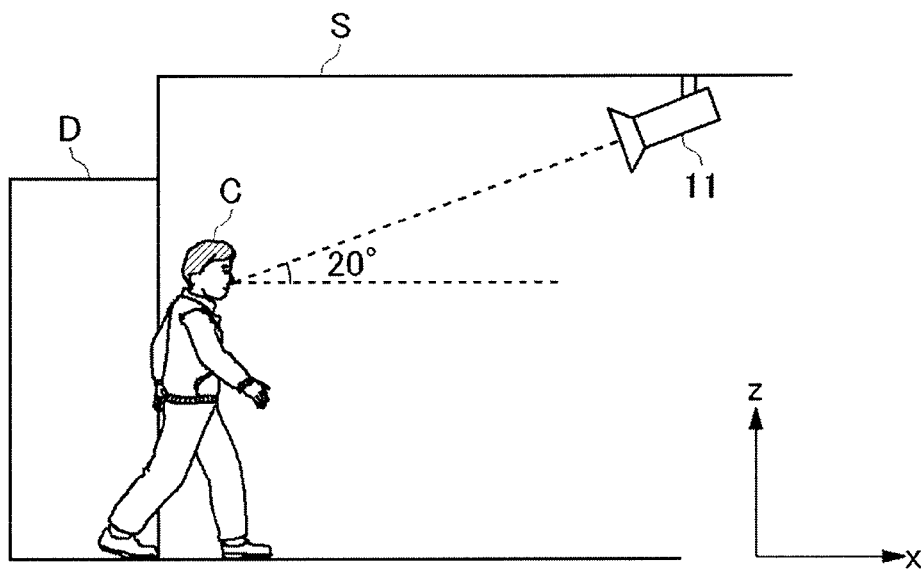
FIG. 3(a) is a diagram in which an example of relationships between a monitoring camera and the position/direction of the face of a customer is seen from a horizontal direction, in the first embodiment of the present invention.
Figure 3B:
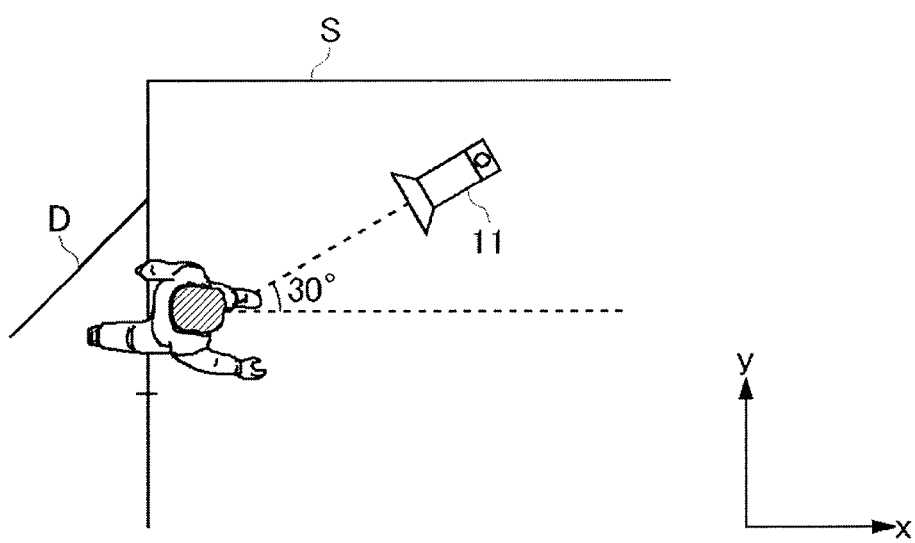
FIG. 3(b) is a diagram in which an example of relationships between the monitoring camera and the position/direction of the face of the customer is seen from a vertical direction, in the first embodiment of the present invention.

FIG. 3(a) is a diagram in which an example of relationships between the monitoring camera 11 and the position/direction of the face of a customer is seen from a horizontal direction; FIG. 3(b) is a diagram in which an example of relationships between the monitoring camera 11 and the position/direction of the face of the customer is seen from a vertical direction; and FIG. 3(c) is a diagram showing an example of an image taken by this monitoring camera 11.

Figure 3C:
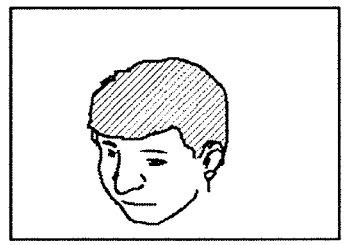
FIG. 3(c) is a diagram showing an example of an image taken by the monitoring camera in the first embodiment of the present invention.

In the case where the monitoring camera 11 is installed so as to photograph the face of a customer C coming into a store building S through a door D, diagonally from a direction 30 degrees leftward and 20 degrees upward from the front of the face as shown in FIGS. 3(a) and 3(b), the face of the human is shown in a state of facing 30 degrees rightward and 20 degrees downward in a taken image as shown in FIG. 3(c). Therefore, the environment-dependent attribute is 30 degrees rightward and 20 degrees downward. In this case, the user specifies the 30 degrees rightward and the 20 degrees downward in the environment-dependent attribute specifying section 124 in accordance with such an installation state of the monitoring camera 11. The installation direction of the camera relative to the direction of the face of the customer may be set as the environment-dependent attribute. In this case, in the example in FIGS. 3(a) and 3(b), the environment-dependent attribute is leftward 30 degrees and upward 20 degrees.

The relearning control server 13 is provided with a relearning section 131, a learning data acquiring/providing section 133 and a communication section 134. The learning data acquiring/providing section 133 acquires learning data on the basis of an environment-dependent attribute specified by the environment-dependent attribute specifying section 124 of the age/gender estimation apparatus 12. Specifically, the learning data acquiring/providing section 133 generates a request for acquiring an environment-dependent attribute which is the same as or close to the environment-dependent attribute specified by the environment-dependent attribute specifying section 124. In the above example, the direction of the face of a human as an environment-dependent attribute of the age/gender estimation system 10 is 30 degrees rightward and 20 degrees downward, and, therefore, a request for acquiring learning data having an environment-dependent attributes close to this environment-dependent attribute (for example, within plus or minus 10 degrees) is generated.

Figure 4A:
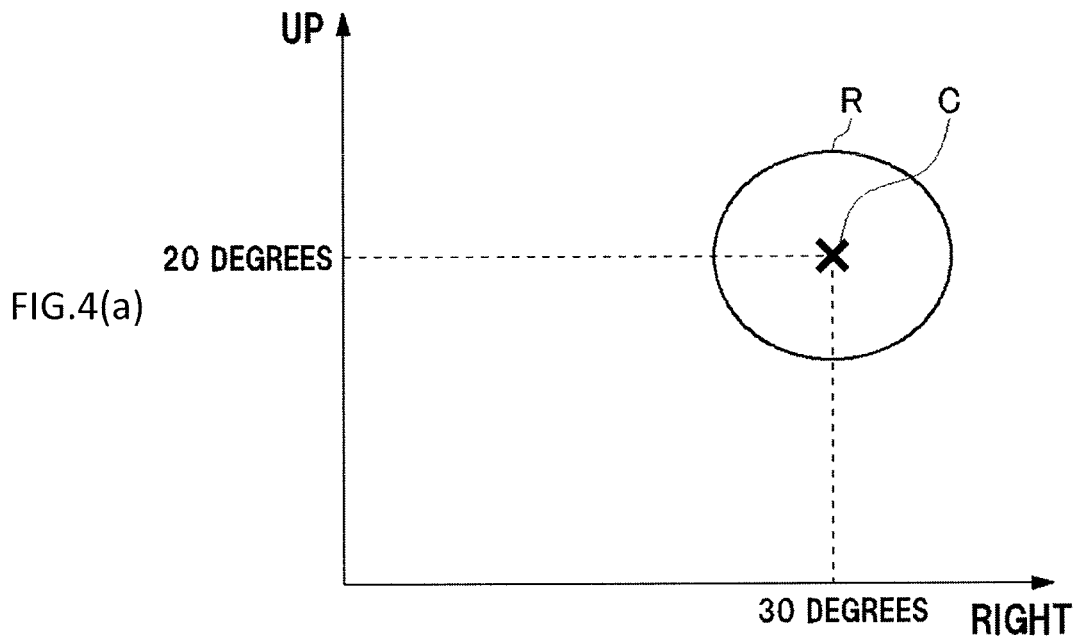
FIG. 4(a) is a diagram for illustrating a request for learning data in the first embodiment of the present invention.

FIG. 4(a) is a diagram for illustrating the request for learning data. FIG. 4(a) shows an environment-dependent attribute space (two-dimensional). In this environment-dependent attribute space, the horizontal axis shows the horizontal direction of the face of a customer, and the vertical axis shows the vertical direction of the face of the customer. The learning data acquiring/providing section 133 generates a request for acquiring learning data within a predetermined range R which includes an area around a center C, the center C being a point indicated by the 30 degrees rightward and the 20 degrees downward in the environment-dependent attribute space.

The communication section 134 transmits the request for the learning data generated by the learning data acquiring/providing section 133, to the other age/gender estimation systems constituting the cooperation system. When the desired learning data is transmitted from another age/gender estimation system in response to the request for the learning data, the communication section 134 receives it, and the learning data acquiring/providing section 133 acquires the learning data.

Figure 4B:
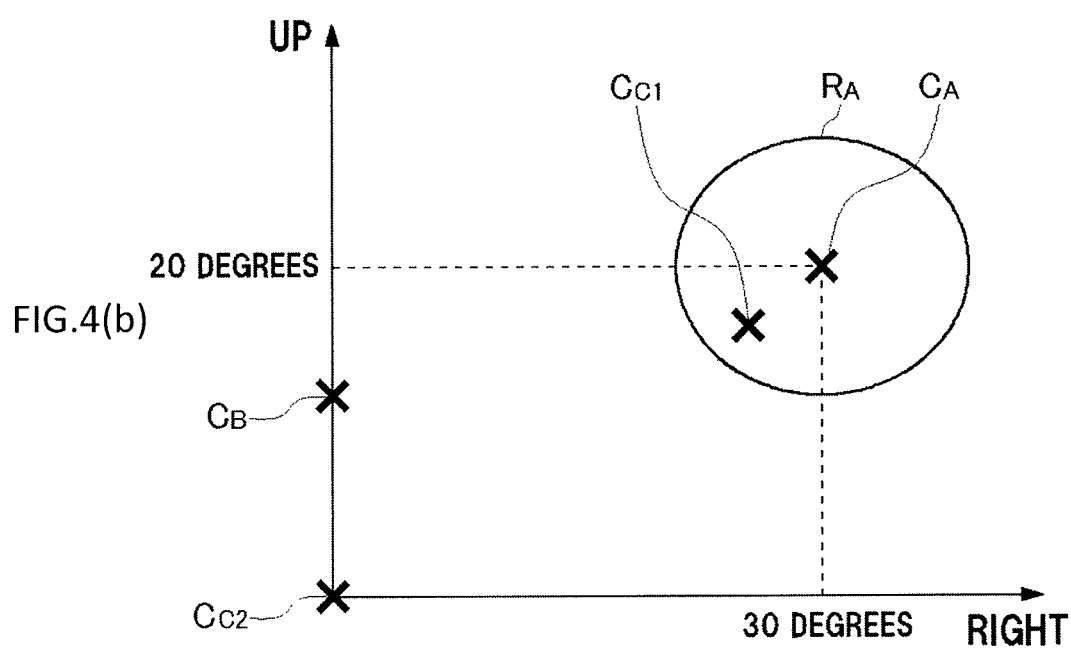
FIG. 4(b) is a diagram for illustrating learning data to be acquired, in the first embodiment of the present invention.

FIG. 4(b) is a diagram for illustrating learning data to be acquired. FIG. 4(b) shows the case where the relearning control server 13A shown in FIG. 2 generates a request for acquiring learning data within a predetermined range $R_A$ which includes an area around a center $C_A$, the center $C_A$ being a point indicated by the 30 degrees rightward and the 20 degrees downward in an environment-dependent attribute space. As shown in FIG. 4(b), an environment-dependent attribute $C_{C1}$ of the monitoring camera 11C1 of the store C is inside the requested range $R_A$, and an environment-dependent attributes $C_B$ and $C_{C2}$ of the monitoring camera 11B of the store B and the monitoring camera 11C2 of the store C are outside the requested range $R_A$. Therefore, learning data of the monitoring camera 11C1 of the store C, the environment-dependent attribute of which is inside the requested range $R_A$, is transmitted from the relearning control server 13C to the relearning control server 13A, and learning data of the monitoring camera 11B of the store B and the monitoring camera 11C2 of the store C, the environment-dependent attributes of which are outside the requested range $R_A$, are not transmitted to the relearning control server 13A.

The relearning section 131 performs learning of estimation parameters stored in the estimation parameter storing section 123 using the learning data acquired by the learning data acquiring/providing section 133 and updates the estimation parameters.

By doing this, the age/gender estimation system 10 can supplement learning data having an environment-dependent attribute close to its environment-dependent attribute from another age/gender estimation system to perform relearning for estimation parameters. Therefore, it is possible to obtain estimation parameters more corresponding to the actual installation state than uniform estimation parameters on the basis of learning images obtained by photographing in an experimental laboratory, and, as a result, the accuracy of estimation of age and gender is improved.

Furthermore, the age/gender estimation system 10 can perform relearning for estimation parameters corresponding to its environment-dependent attribute immediately after being installed, without the necessity of performing learning while accumulating results of operation.

(Configuration for Generating Learning Data for Relearning by Other Age/Gender Estimation Systems)

The age/gender estimation apparatus 12 is further provided with a correct answer inputting section 125, and the relearning control server 13 is further provided with a learning data storing section 132. When a human is photographed by the monitoring camera 11, and the face detecting section 121 detects a face of the human from an image, an image of the face is stored into the learning data storing section 132.

The correct answer inputting section 125 inputs age and gender for the face image stored in the learning data storing section 132. The user judges the age and gender of the human of the face image stored in the learning data storing section 132 and inputs them to the correct answer inputting section 125 as a correct answer. In this embodiment, a face image and information about the age and gender of the human are combined as a set and become learning data in this way. In the learning data, age may be specified as an age section like early teens, late teens, early twenties, . . . , or may be specified as a social position changing with age like such as a high-school student and a university student.

When a request for learning data is transmitted from another age/gender estimation system, the communication section 134 receives it. The learning data acquiring/providing section 133 refers to the environment-dependent attribute specifying section 124 and judges whether a requested environment-dependent attribute corresponds to an environment-dependent attribute specified by the environment-dependent attribute specifying section 124 and stored. If the requested environment-dependent attribute corresponds to the environment-dependent attribute specified by the environment-dependent attribute specifying section 124 and stored, the learning data acquiring/providing section 133 reads out the learning data stored in the learning data storing section 132, and the communication section 134 returns the data read out by the learning data acquiring/providing section 133 to that other age/gender estimation system from which the request was received.

As described above, the age/gender estimation system 10 itself may perform relearning using the learning data stored in the learning data storing section 132. Specifically, the relearning section 131 performs relearning using the learning data stored in the learning data storing section 132 and updates estimation parameters stored in the estimation parameter storing section 123 at a predetermined timing after operation is started.

Figure 5:
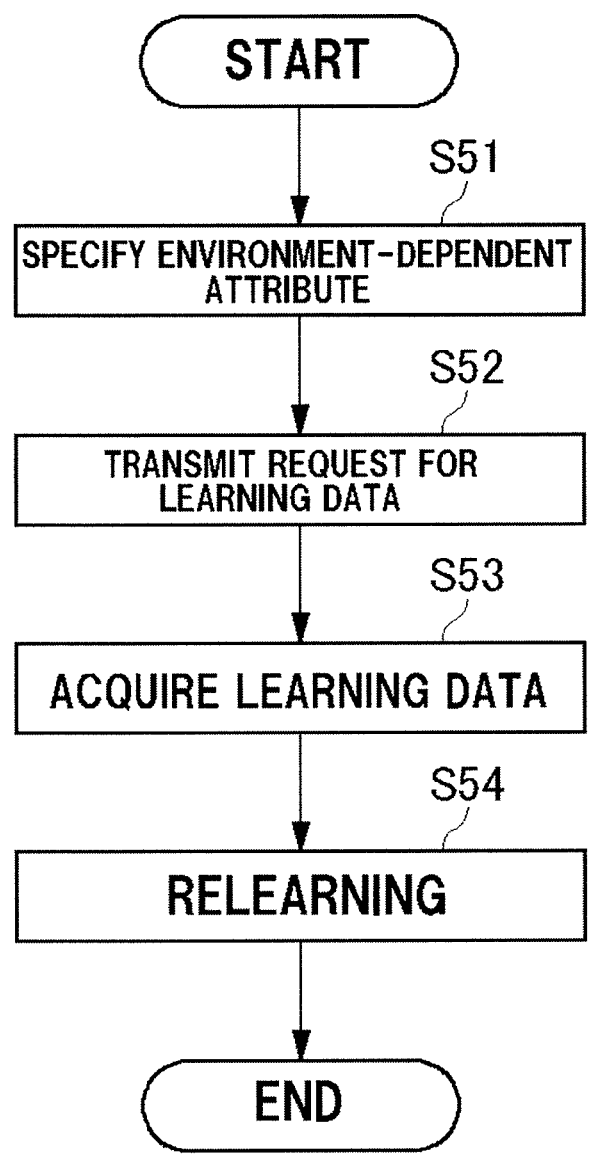
FIG. 5 is a flowchart of a process for performing relearning using a learning result of another existing age/gender estimation system, in the age/gender estimation system of the first embodiment of the present invention.

FIG. 5 is a flowchart of a process for performing relearning using a learning result of another existing age/gender estimation system, in the age/gender estimation system 10 of the first embodiment. This process flow is executed when the age/gender estimation system 10 is newly installed. First, the user specifies an environment-dependent attribute in the environment-dependent attribute specifying section 124 in accordance with the installation state of the monitoring camera 11 (step S51). Next, the learning data acquiring/providing section 133 generates a request for learning data which includes an area around the specified environment-dependent attribute, and the communication section 134 transmits the request (step S52).

When desired learning data is transmitted from another age/gender estimation system in response to the request for learning data, the communication section 134 receives the learning data, and the learning data acquiring/providing section 133 acquires it (step S53). Next, the relearning section 131 performs relearning on the basis of the learning data acquired by the learning data acquiring/providing section 133 and updates estimation parameters stored in the estimation parameter storing section 123 (step S54).

Figure 6:
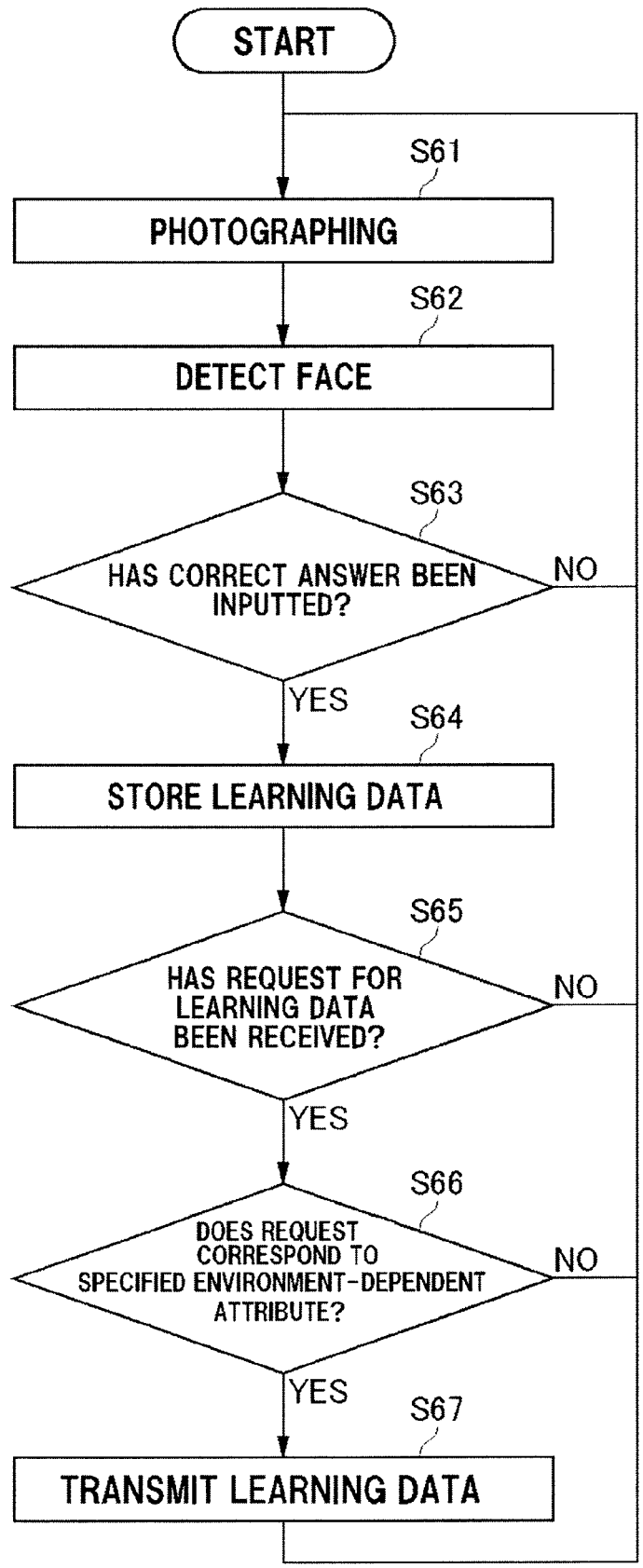
FIG. 6 is a flowchart of a process for the age/gender estimation system of the first embodiment of the present invention itself to generate learning data.

FIG. 6 is a flowchart of a process for generating learning data for relearning by other age/gender estimation systems, in the age/gender estimation system 10 of the first embodiment. This process flow is executed after the operation of the age/gender estimation system 10 is started. The monitoring camera 11 photographs a photographing target position and outputs a taken image to the face detecting section 121 (step S61). The face detecting section 121 detects a face from the image and outputs a face image to the learning data storing section 132 (step S62).

The user can judge the age and gender of an unjudged face image stored in the learning data storing section 132 and input a judgment result as a correct answer at an appropriate timing (step S63). Detection of a face and storage of a face image are repeated until the user inputs a correct answer (step S63: NO). When a correct answer is inputted by the user (step S63: YES), the inputted correct answer information is stored into the learning data storing section 132 together with a corresponding face image as learning data (step S64).

Next, it is judge whether or not the communication section 134 has received a request for learning data from another age/gender estimation system (step S65). While a request for learning data is not received from another age/gender estimation system (step S65: NO), steps S61 to S64 are repeated. When the communication section 134 receives a request for learning data from another age/gender estimation system (step S65: YES), the learning data acquiring/providing section 133 judges whether or not the environment-dependent attribute of this age/gender estimation system 10 stored in the environment-dependent attribute specifying section 124 and this received request correspond to each other (step S66).

If the requests correspond to the environment-dependent attribute of this age/gender estimation system 10 (step S66: YES), the learning data acquiring/providing section 133 reads out the learning data stored in the learning data storing section 132, and the communication section 134 transmits it to that other age/gender estimation system which transmitted the request (step S67). If the requests do not correspond to the environment-dependent attribute of this age/gender estimation system 10 (step S66: NO), the flow returns to step S61, ignoring the request for learning data.

As described above, according to the age/gender estimation system 10 of the first embodiment of the present invention, it is possible to acquire learning data appropriate for the environment-dependent attribute of the age/gender estimation system 10 from another age/gender estimation system by causing multiple age/gender estimation systems 10 to cooperate with one another to configure a cooperation system. Therefore, it is possible to perform relearning for estimation parameters on the basis of learning data appropriate for the environment-dependent attribute of the age/gender estimation system 10 immediately after installation of the age/gender estimation system 10, and, thereby, it is possible to improve the accuracy of estimation of age and gender.

In the above embodiment, the environment-dependent attribute of the age/gender estimation system 10 is inputted by the user in accordance with the installation state of the monitoring camera 11. However, the input may be automatically performed. For example, in the case where the monitoring camera 11 is attached to the ceiling of a store via a fixture, a sensor for detecting the angle of the monitoring camera 11 relative to the fixture may be provided so that the direction of the camera is inputted to the environment-dependent attribute specifying section 124 as an environment-dependent attribute on the basis of output from the sensor.

[Second Embodiment]

Next, an age/gender estimation system of a second embodiment of the present invention will be described. In the second embodiment also, a cooperation system is configured by multiple age/gender estimation systems cooperating with one another, similarly to the first embodiment. In the age/gender estimation system 10 of the first embodiment, an environment-dependent attribute is specified by the user in accordance with the installation state of the monitoring camera 11 of the age/gender estimation system 10 when the age/gender estimation system 10 is installed. In comparison, in an age/gender estimation system 20 of the second embodiment, multiple test images are taken before start of operation after installation of the age/gender estimation system 20, and an environment-dependent attribute is determined on the basis of the test images.

Figure 7:
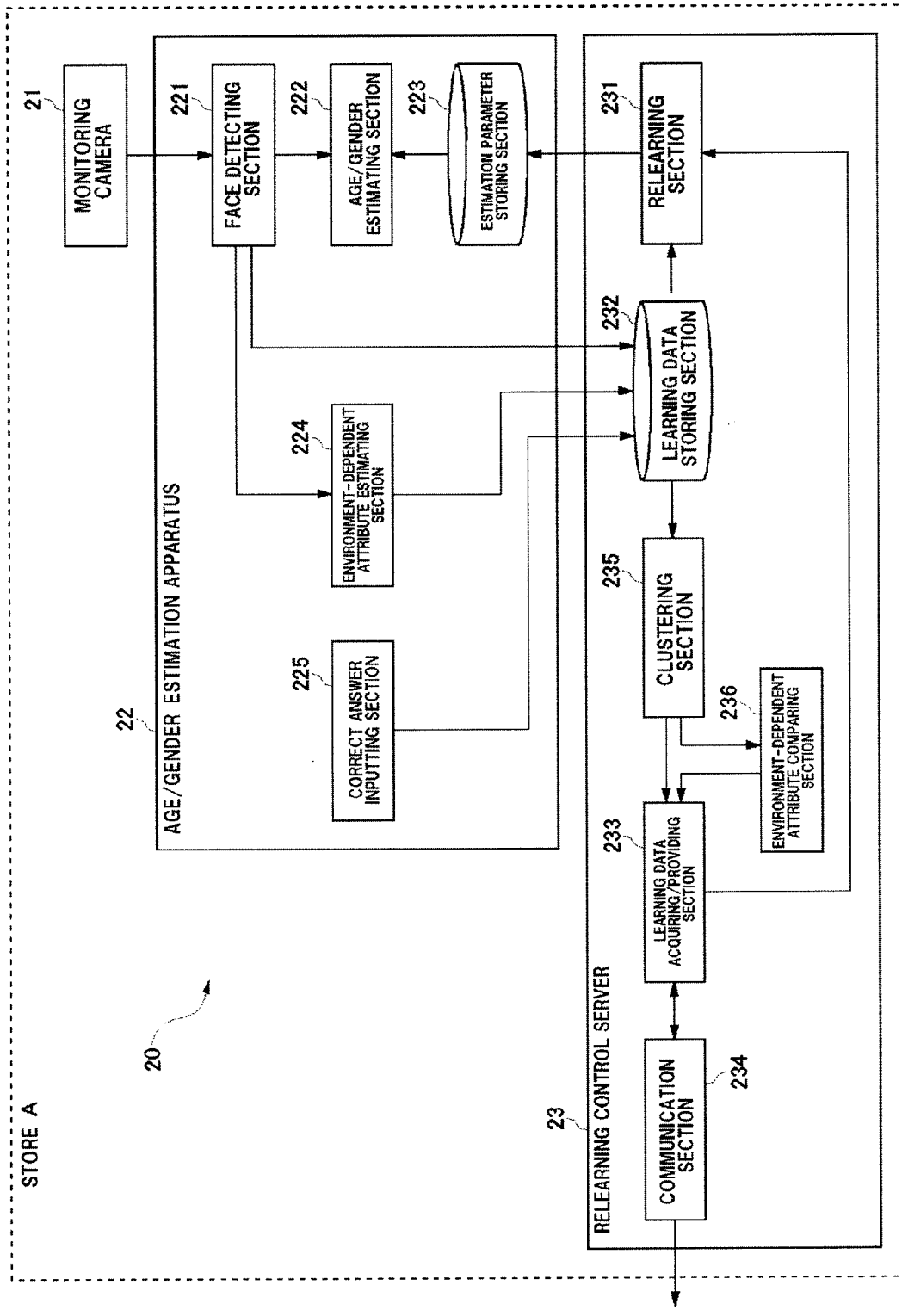
FIG. 7 is a diagram showing the configuration of an age/gender estimation system in a second embodiment of the present invention.

FIG. 7 is a diagram showing the configuration of the age/gender estimation system 20 of the second embodiment. Similarly to the age/gender estimation system 10 of the first embodiment, the age/gender estimation system 20 is provided with a monitoring camera 21, an age/gender estimation apparatus 22 and a relearning control server 23. A configuration for estimating age and gender by the age/gender estimation apparatus 22 is similar to that of the first embodiment. That is, a face detecting section 221 detects a face image, an age/gender estimating section 222 estimates age and gender using estimation parameters stored in an estimation parameter storing section 223.

In the age/gender estimation system 20 of this embodiment, a configuration for performing relearning using a learning result of an another existing age/gender estimation system and a configuration for generating learning data for relearning by other age/gender estimation systems are different from those of the first embodiment, and, therefore, they will be described below.

The age/gender estimation apparatus 22 is provided with the face detecting section 221, the age/gender estimating section 222, the estimation parameter storing section 223, an environment-dependent attribute estimating section 224 and a correct answer inputting section 225. The face detecting section 221 is installed so that it photographs a place where an unspecified large number of humans whose age and gender are to be estimated come. The monitoring camera 11 takes a video and generates continuous frame images, or takes still images at predetermined time intervals, and then outputs them to the age/gender estimation apparatus 22.

The face detecting section 221 detects an area of the face of a human from an image acquired from the monitoring camera 21 and outputs it to the environment-dependent attribute estimating section 224. As described above, in the age/gender estimation system 20 of this embodiment, multiple test images are taken at the time of installation, and an environment-dependent attribute of the age/gender estimation system 20 is estimated on the basis of the test images. Therefore, at the time of installation, face images of the test images are outputted from the face detecting section 221 to the environment-dependent attribute estimating section 224. Here, the multiple test images are selected in a manner that results of estimation of age and gender about them are not unbalanced.

The environment-dependent attribute estimating section 224 estimates the environment-dependent attribute of the age/gender estimation system 20 on the basis of the face images detected from the test images (hereinafter referred to as "test face images"). In this embodiment, a face direction (horizontal and vertical directions) and a face feature of a face image are environment-dependent attributes. The face feature means a feature created between a face image and a face attribute feature, and it may be, for example, a Gabor feature, an LBP (Local Binary Pattern) feature, a Haar-like feature or the like. In this embodiment, the Gabor feature is adopted as the face feature.

As for the face direction, the environment-dependent attribute estimating section 224 determines it using a predetermined parameter (model) by an existing method (for example, a neural network, an active appearance model method, a support vector machine method or the like). As for the Gabor feature, it is determined by performing Gabor transformation of a face image. Because being very large, the number of dimensions of the Gabor feature may be reduced by using main component analysis.

The relearning control server 23 is provided with a learning data storing section 232, a learning data acquiring/providing section 233, a communication section 234, a clustering section 235 and an environment-dependent attribute comparing section 236. The learning data storing section 232 stores learning data of multiple test face images taken before start of operation after installation (hereinafter referred to as "test learning data"). The learning data storing section 232 also stores learning data used at the time of determining initial estimation parameters (hereinafter referred to as "initial learning data"). In this embodiment, learning data is constituted by a face image, the environment-dependent attribute of the face image, and information about age and gender (correct answer information). The environment-dependent attribute in the test learning data stored in the learning data storing section 232 is what was estimated by the environment-dependent attribute estimating section 224 on the basis of the test face images.

Figure 8B:
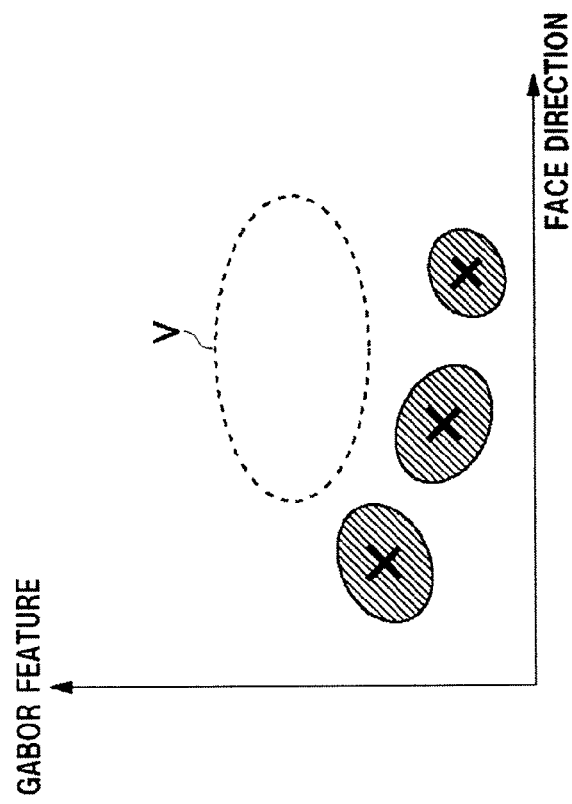
FIG. 8(b) is a diagram showing an example in which initial learning data is distributed in the environment-dependent attribute space in the second embodiment of the present invention.
Figure 8A:
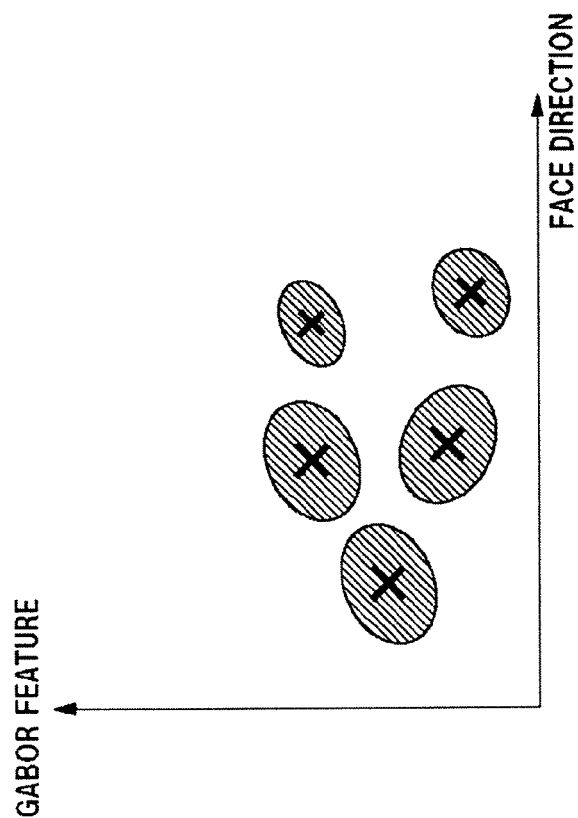
FIG. 8(a) is a diagram showing an example in which test learning data is distributed in an environment-dependent attribute space in the second embodiment of the present invention.

The clustering section 235 performs clustering of each of the test learning data and the initial learning data. Specifically, the clustering section 235 first distributes each of the test learning data and the initial learning data in an environment-dependent attribute space. FIG. 8(a) is a diagram showing an example in which the test learning data is distributed in the environment-dependent attribute space, and FIG. 8(b) is a diagram showing an example in which the initial learning data is distributed in the same environment-dependent attribute space as FIG. 8(a). The clustering section 235 performs clustering of these distributions and determines the center of each cluster distribution.

As described above, the environment-dependent attributes in this embodiment are a face direction (two dimensions of horizontal and vertical directions) and a Gabor feature (multidimensional). In FIGS. 8(a) and 8(b), however, each of the face direction and the Gabor feature is shown in one dimension, and the horizontal axis and the vertical axis indicate the face direction and the Gabor feature, respectively.

The environment-dependent attribute comparing section 236 compares the distribution of the test learning data with the distribution of the initial learning data. The learning data acquiring/providing section 233 generates a request for learning data (hereinafter referred to as "external learning data") so that a part V where the distribution of the initial learning data lacks in comparison with the distribution of the test learning data is filled, on the basis of a result of the comparison by the environment-dependent attribute comparing section 236. That is, the age/gender estimation system 20 of this embodiment replenishes learning data of an environment-dependent attribute which does not exist in the initial learning data but exists in an image (test image) taken by the actually installed monitoring camera 21 from another age/gender estimation system as external learning data. The communication section 234 transmits the request for learning data generated by the learning data acquiring/providing section 233 to the other age/gender estimation system.

When desired external learning data is transmitted from another age/gender estimation system in response to the request, the communication section 234 receives it, and the learning data acquiring/providing section 233 acquires the external learning data. The relearning section 231 performs relearning for the estimation parameters stored in the estimation parameter storing section 223 using the external learning data acquired by the learning data acquiring/providing section 233 and the initial learning data to update the estimation parameters. In this relearning, the test learning data may be further used.

It is also conceivable that the environment-dependent attribute comparing section 236 compares the test learning data and the initial learning data, and the relearning section 231 performs relearning after clusters in an area which exists in the initial learning data but does not exist in the test learning data are deleted. In some cases, the accuracy of estimation can be improved by deleting unnecessary learning data as described above.

Figure 9B:
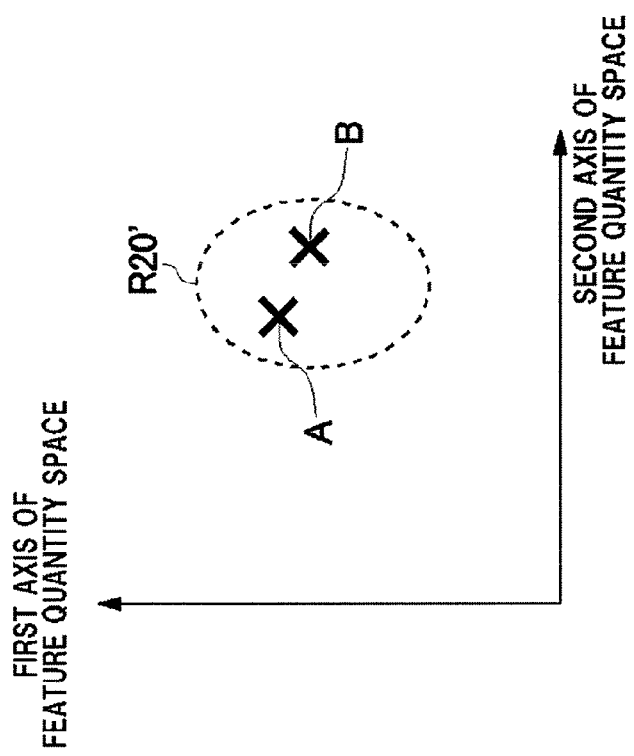
FIG. 9(b) is a diagram showing the feature quantity space (after relearning) for estimation of age in the second embodiment of the present invention.
Figure 9A:
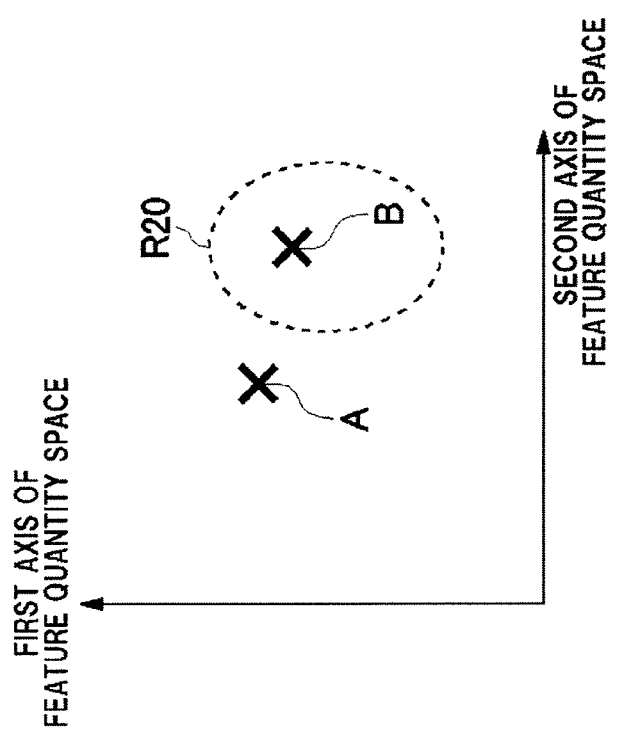
FIG. 9(a) is a diagram showing a feature quantity space (before relearning) for estimation of age in the second embodiment of the present invention.

FIG. 9(a) is a diagram showing a feature quantity space for estimation of age, and it shows the feature quantity space before relearning. FIG. 9(b) is a diagram showing a feature quantity space for estimation of age, and it shows the feature quantity space after relearning. For example, in the case of estimating age by linear discriminant analysis, a feature quantity space for estimation of age is created by the linear discriminant analysis. Each axis of the feature quantity space does not have a physical meaning unlike a face direction and the Gabor feature. In FIGS. 9(a) and 9(b), the axes of the feature quantity space are named "first axis of the feature quantity space" and "second axis of the feature quantity space" for convenience of description. The feature quantity space for estimation of age is a space of a feature quantity which indicates age well. As for gender, it may be estimated with the use of another feature quantity space. Both of age and gender may be estimated at the same time with the use of a feature quantity space indicating age and gender.

In FIGS. 9(a) and 9(b), face images A and B are face images which should be estimated to be that in the twenties. Before relearning, the distance between the face images A and B is relatively long in the feature quantity space, and the face image B is included in an area R20 of face images estimated to be in the twenties though the face image A is not included in the area, as shown in FIG. 9(a). By performing the above relearning, the feature quantity space is updated. The distance between the face image A and the face image B is shorter, and both are included in an area R20' of face images estimated to be in the twenties, as shown in FIG. 9(b).

Figure 10:
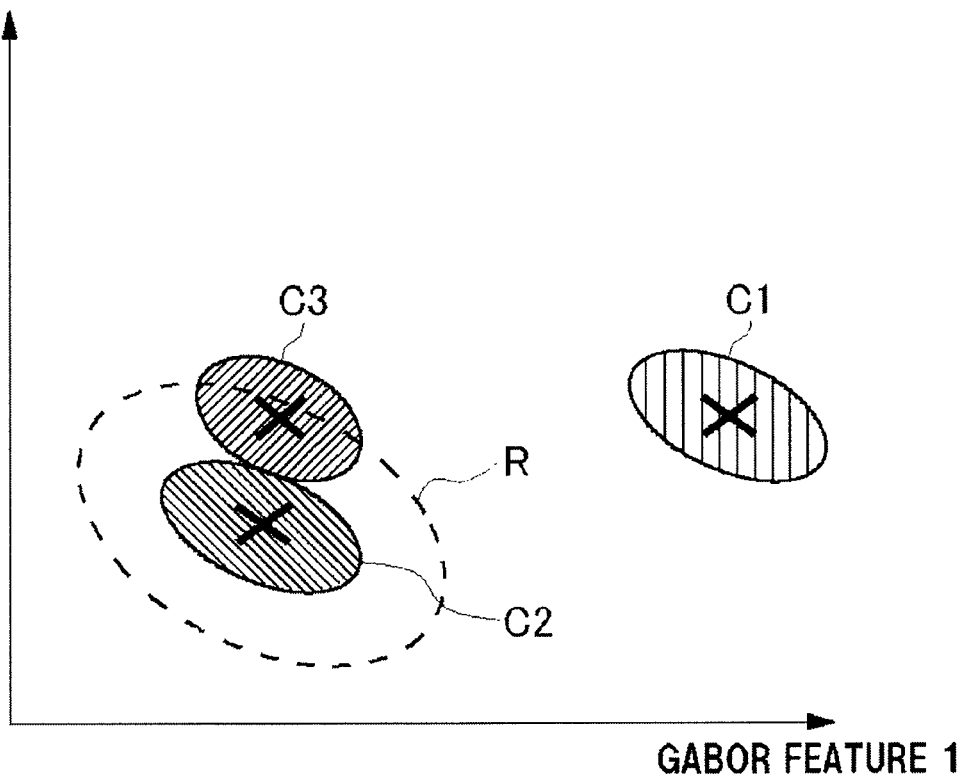
FIG. 10 is a diagram showing a facial feature space as an environment-dependent attribute space in the second embodiment of the present invention.

FIG. 10 is a diagram showing a facial feature space as an environment-dependent attribute space. Though the Gabor feature and a face direction are environment-dependent attributes in this embodiment as described above, FIG. 10 two-dimensionally shows only the Gabor feature. In FIG. 10, a cluster C1 is a cluster of face images in the twenties of initial learning data, a cluster C2 is a cluster of face images in the twenties of test learning data, and a cluster C3 is a cluster of face images in the twenties of external learning data.

As shown in FIG. 10, when the learning data acquiring/providing section 233 requests external learning data, it requests learning data existing at a position close to the cluster C2 of the test learning data existing at a position away from the cluster C1 of the initial learning data. Specifically, it requests learning data of a cluster the center of which exists in a range R within a predetermined distance from the center of the cluster C2.

By doing so, learning data having an environment-dependent attribute close to the environment-dependent attribute of an image actually taken by the monitoring camera 21 of the age/gender estimation system 20 is reinforced. As a result, the feature quantity space for estimation of age changes, and more images actually taken by the monitoring camera 21 of the age/gender estimation system 20 belong to a correct estimation area in the feature quantity space as described in FIG. 9. Thereby, the accuracy of estimation is improved.

Figure 11:
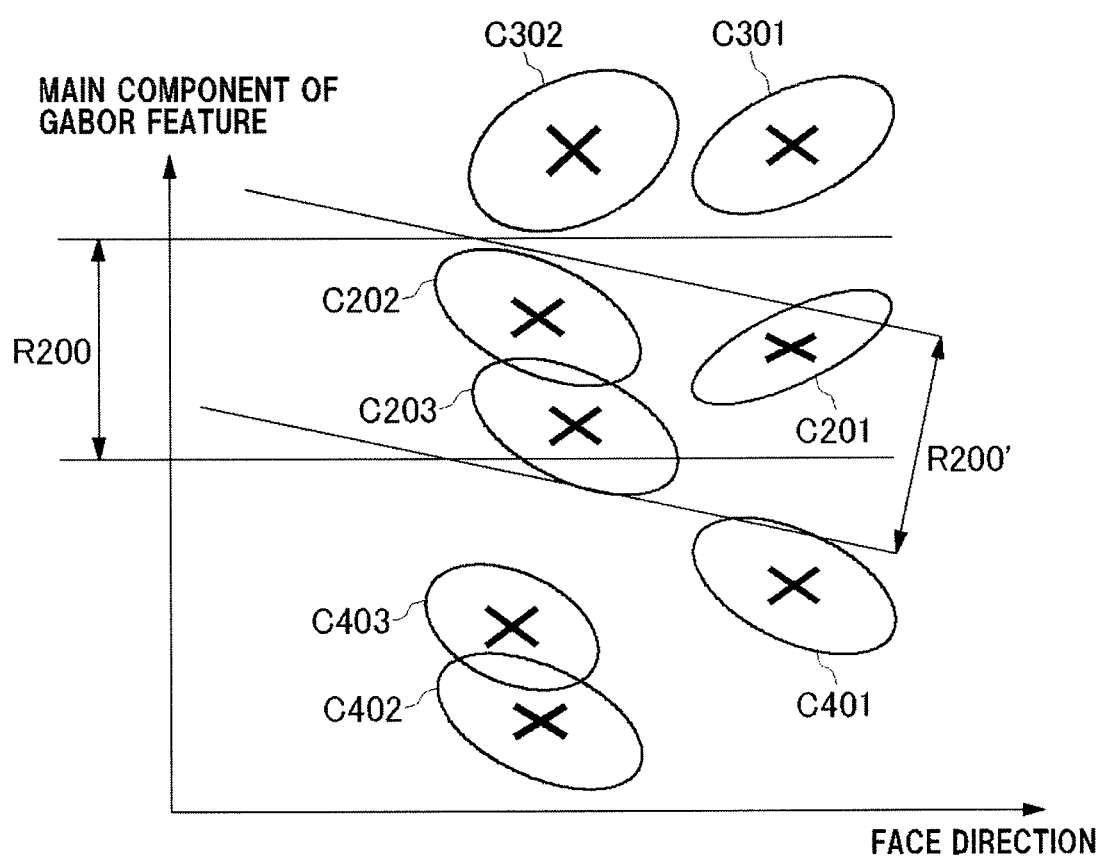
FIG. 11 is a diagram for illustrating that the range of estimation in the environment-dependent attribute space changes according to external learning data, in the second embodiment of the present invention.

FIG. 11 is a diagram for illustrating that the range of estimation in the environment-dependent attribute space changes according to external learning data. In FIG. 11, the vertical axis indicates the Gabor feature, and the horizontal axis indicates a face direction. Here also, the Gabor feature which is originally multidimensional is one-dimensionally indicated by only the vertical axis, and the face direction which is originally two-dimensional is one-dimensionally indicated by only the horizontal axis, for convenience of description.

In FIG. 11, all of clusters C401, C402 and C403 are clusters of face images in the forties and are a cluster which includes initial learning data but does not include test learning data, a cluster which includes both of the initial learning data and the test learning data, and a cluster which includes both of external learning data and the test learning data, respectively. All of the clusters C201, C202 and C203 are clusters of face images in the twenties and are a cluster which includes initial learning data but does not include test learning data, a cluster which includes both of the initial learning data and the test learning data, and a cluster which includes both of external learning data and the test learning data, respectively. All of the clusters C301 and C302 are clusters of face images in the thirties and are a cluster which includes initial learning data but does not include test learning data and a cluster which includes both of the initial learning data and the test learning data, respectively.

Though the range of face images estimated to be in the twenties is the area R200 which includes the initial learning data, the clusters C201 and C202, before relearning, it changes to the area R200' after the relearning due to the cluster C203 which includes both of the test learning data and the external learning data being added. Though the range R200 of face images estimated to be in the twenties before the relearning cannot include the whole cluster C203 which includes the test learning data, the range R200' of face images estimated to be in the twenties after the relearning includes the whole C203 which includes the test learning data. Therefore, the accuracy of estimation of age is higher after the relearning in comparison with that before the relearning.

If the test learning data is gathered before start of operation after installation, there is a possibility that the number of the test learning data is smaller, but this does not matter. The reason is that, even if the number of the test learning data is smaller in the cluster C203 which includes both of the test learning data and the external learning data, the number of data in the cluster C203 increases by acquiring a lot of external learning data having close environment-dependent attributes, and relearning appropriate when seen from the viewpoint of the number of data is performed.

Figure 12:
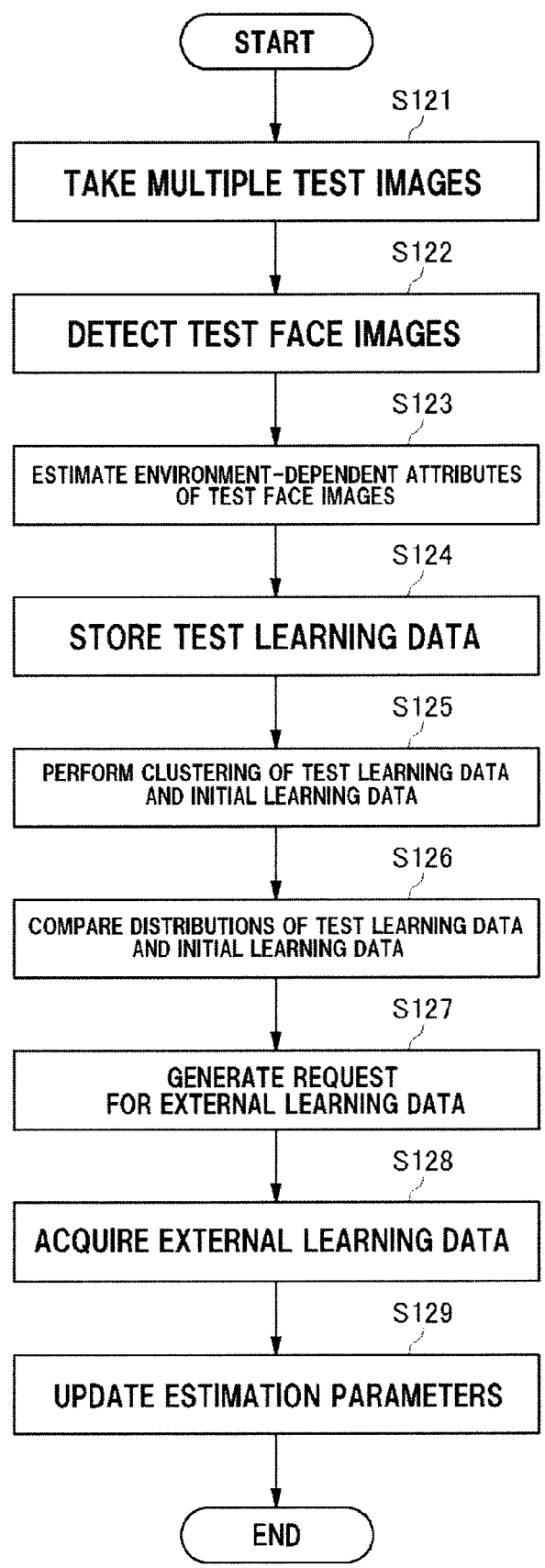
FIG. 12 is a flowchart of a process for performing relearning using a learning result of another existing age/gender estimation system, in the age/gender estimation system of the second embodiment of the present invention.

FIG. 12 is a flowchart of a process for performing relearning using a learning result of another existing age/gender estimation system, in the age/gender estimation system 20 of the second embodiment. This process flow is executed when the age/gender estimation system 20 is newly installed. First, multiple test images are taken in a state that the monitoring camera 21 is installed (step S121). The face detecting section 221 detects faces from the test images and outputs test face images to the environment-dependent attribute estimating section 224 and the learning data storing section 232 (step S122).

The environment-dependent attribute estimating section 224 estimates environment-dependent attributes of the test face images detected by the face detecting section 221 (step S123). For each of the test face images, the correct answer inputting section 225 accepts a correct answer input for age and gender, and stores it into the learning data storing section 232 together with the test face image concerned and an environment-dependent attribute estimated about the test face image as test learning data (step S124). The clustering section 235 distributes each of the test learning data and initial learning data stored in the learning data storing section 232 in an environment-dependent attribute space and performs clustering (step S125).

Next, the environment-dependent attribute comparing section 236 compares the distribution of the test learning data with the distribution of the initial learning data (step S126). The learning data acquiring/providing section 233 generates a request for external learning data so that a part where the distribution of the initial learning data lacks in comparison with the distribution of the test learning data is filled, on the basis of a result of the comparison by the environment-dependent attribute comparing section 236, and the communication section 234 transmits it (step S127).

When desired learning data is transmitted from another age/gender estimation system, the communication section 234 receives the learning data, and the learning data acquiring/providing section 233 acquires it (step S128). Next, the relearning section 231 performs relearning on the basis of the external learning data acquired by the learning data acquiring/providing section 233 and the initial learning data stored in the learning data storing section 232, and updates estimation parameters stored in the estimation parameter storing section 223 (step S129).

Figure 13:
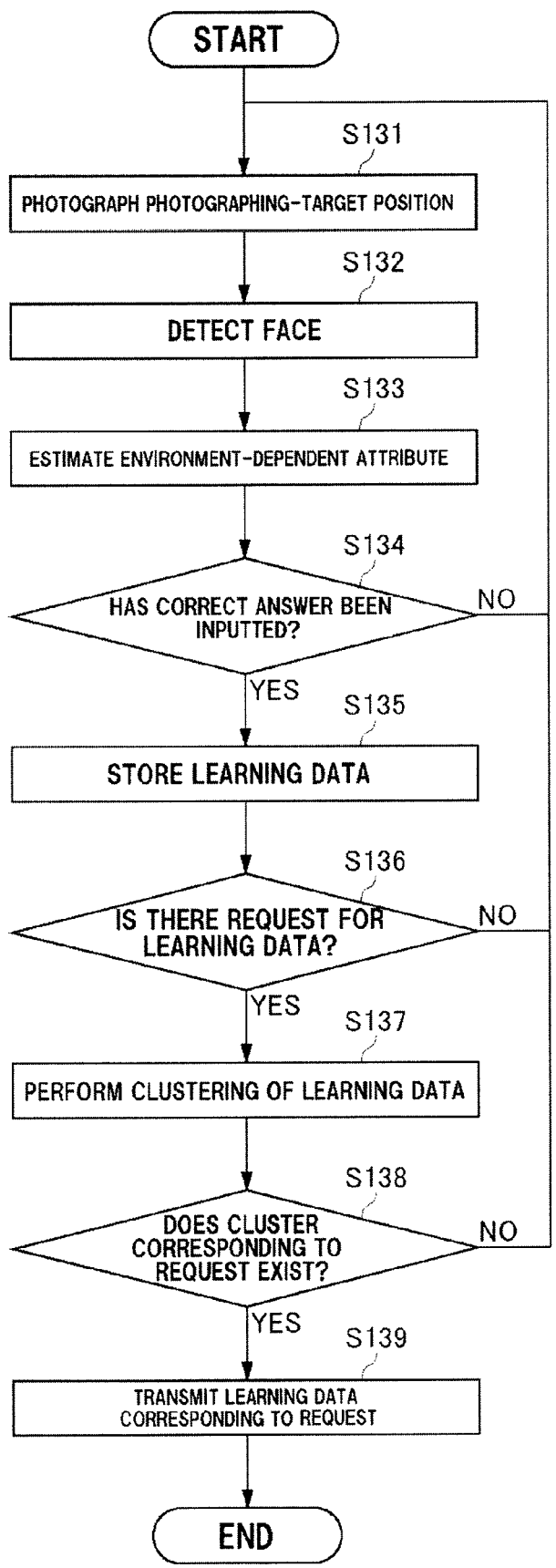
FIG. 13 is a flowchart of a process for the age/gender estimation system of the second embodiment of the present invention itself to generate learning data.

FIG. 13 is a flowchart of a process for generating learning data for relearning by other age/gender estimation systems, in the age/gender estimation system 20 in the second embodiment. This process flow is executed after the operation of the age/gender estimation system 20 started. The monitoring camera 21 photographs a photographing target position and outputs a taken image to the face detecting section 221 (step S131). The face detecting section 221 detects a face from the image and outputs a face image to the environment-dependent attribute estimating section 224 and the learning data storing section 232 (step S132).

The environment-dependent attribute estimating section 224 estimates environment-dependent attribute of the face image outputted from the face detecting section 221 and stores the estimated environment-dependent attribute into the learning data storing section 232 together with the face image concerned (step S133). The user can judge the age and gender of an unjudged face image stored in the learning data storing section 132 and input a judgment result as a correct answer at an appropriate timing (step S134).

Detection of a face and storage of a face image and its environment-dependent attribute are repeated until the user inputs a correct answer (step S134: NO). When a correct answer is inputted by the user (step S134: YES), the inputted correct answer information is stored into the learning data storing section 132 together with a corresponding face image and its environment-dependent attribute as learning data (step S135).

Next, the communication section 234 judges whether or not a request for learning data has been received from another age/gender estimation system (step S136). While a request for learning data is not received from another age/gender estimation system (step S136: NO), steps S131 to S135 are repeated. When the communication section 234 receives a request for learning data from another age/gender estimation system (step S136: YES), the clustering section 235 performs clustering of the learning data stored in the learning data storing section 232 (step S137). Then, the learning data acquiring/providing section 233 judges whether or not a cluster corresponding to the request for learning data received from that other age/gender estimation system exists among clusters generated by the clustering section 235 (step S138).

If the cluster corresponding to the request for learning data received from that other age/gender estimation system exists among the clusters generated by the clustering section 235 (step S138: YES), the learning data acquiring/providing section 233 reads out learning data of the cluster concerned stored in the learning data storing section 232, and the communication section 134 transmits it to that another age/gender estimation system which transmitted the request (step S139). If the corresponding request does not exist (step S138: NO), the flow returns to step S131, ignoring the request for learning data.

As described above, in this embodiment also, the age/gender estimation system 20 can supplement learning data having an environment-dependent attribute close to its environment-dependent attribute from another age/gender estimation system to perform relearning for estimation parameters. Therefore, it is possible to obtain estimation parameters more corresponding to the actual installation state than uniform estimation parameters (initial estimation parameters) on the basis of learning images obtained by photographing in an experimental laboratory, and, as a result, the accuracy of estimation of age and gender is improved.

In the second embodiment, it is also possible to take multiple test images to generate test learning data, arrange them in an environment-dependent attribute space, and set only a test image positioned the closest to the center of each cluster as the test learning data.

[Third Embodiment]

In the first and second embodiments, each age/gender estimation system has a relearning control server, acquires learning data from another age/gender estimation system and performs relearning in the age/gender estimation system, as shown in FIG. 2. However, relearning can be performed by a server shared by multiple age/gender estimation apparatuses. In this case, a result of learning performed by the server can be used by each age/gender estimation apparatus.

Figure 14:
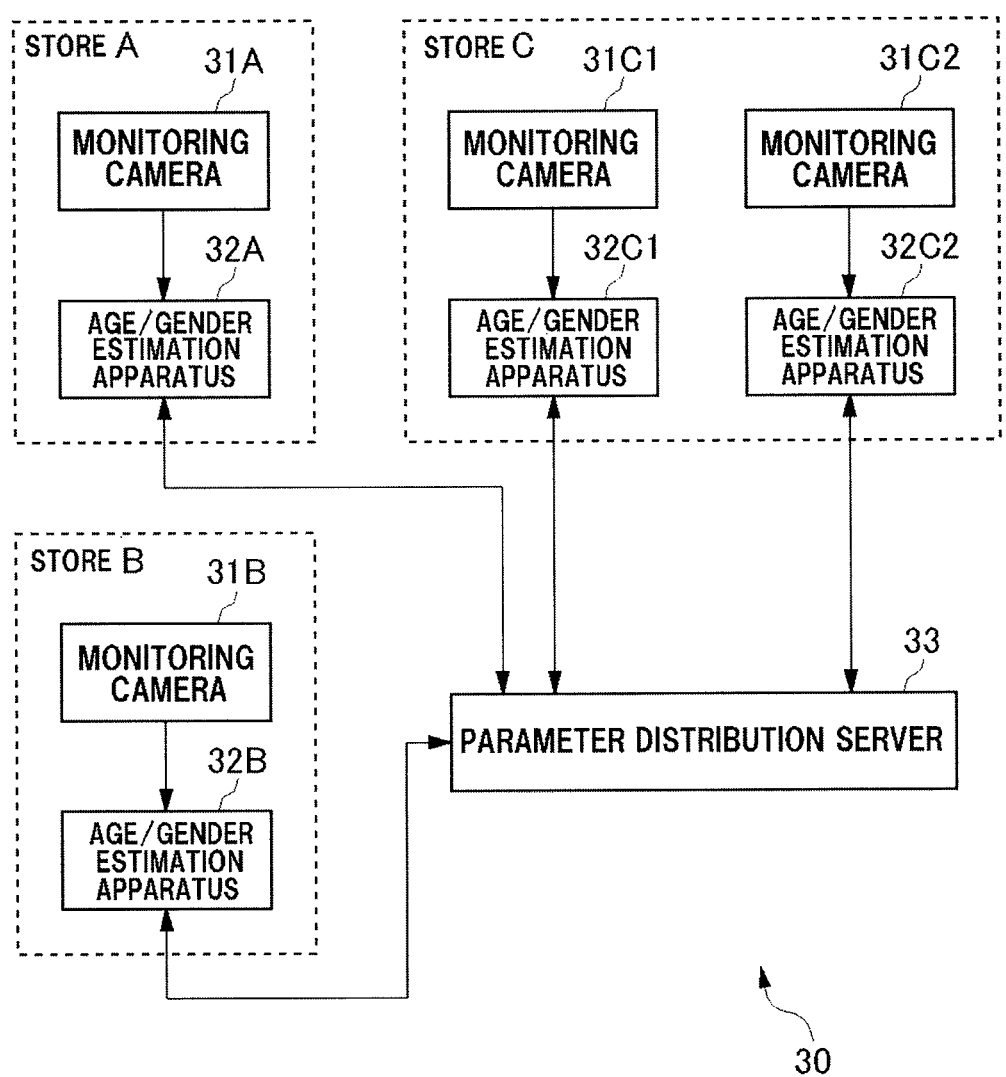
FIG. 14 is a diagram showing the configuration of an age/gender estimation system in a third embodiment of the present invention.

FIG. 14 is a diagram showing the configuration of an age/gender estimation system of a third embodiment of the present invention. An age/gender estimation system 30 is provided with a monitoring camera 31A and an age/gender estimation apparatus 32A installed in a store A, a monitoring camera 31B and an age/gender estimation apparatus 32B installed in a store B, monitoring cameras 31C1 and 31C2 and age/gender estimation apparatuses 32C1 and 32C2 installed in a store C, and a parameter distribution server 33 connected to the age/gender estimation apparatuses 32A, 32B, 32C1 and 32C2.

In the age/gender estimation system 30 of this embodiment, each of the age/gender estimation apparatuses 32A, 32B, 32C1 and 32C2 installed in the stores transmits a request for estimation parameters to the parameter distribution server 33, receives estimation parameters transmitted from the parameter distribution server 33 and updates its own estimation parameters with the received estimation parameters. Especially, similarly to the age/gender estimation systems 10 and 20 of the first and second embodiments, each of the age/gender estimation apparatuses 32A, 32B, 32C1 and 32C2 receives estimation parameters appropriate for its own environment-dependent attribute from the parameter distribution server 33 when the age/gender estimation apparatus is newly installed, and, therefore, operation can be started with the appropriate estimation parameters immediately after installation.

By each of the age/gender estimation apparatuses 32A, 32B, 32C1 and 32C2 transmitting learning data obtained by operation to the parameter distribution server 33, the parameter distribution server 33 generates estimation parameters using the learning data. That is, each of the age/gender estimation apparatuses 32A, 32B, 32C1 and 32C2 receives estimation parameters from the parameter distribution server 33 as well as providing learning data for the other age/gender estimation apparatuses.

Figure 15:
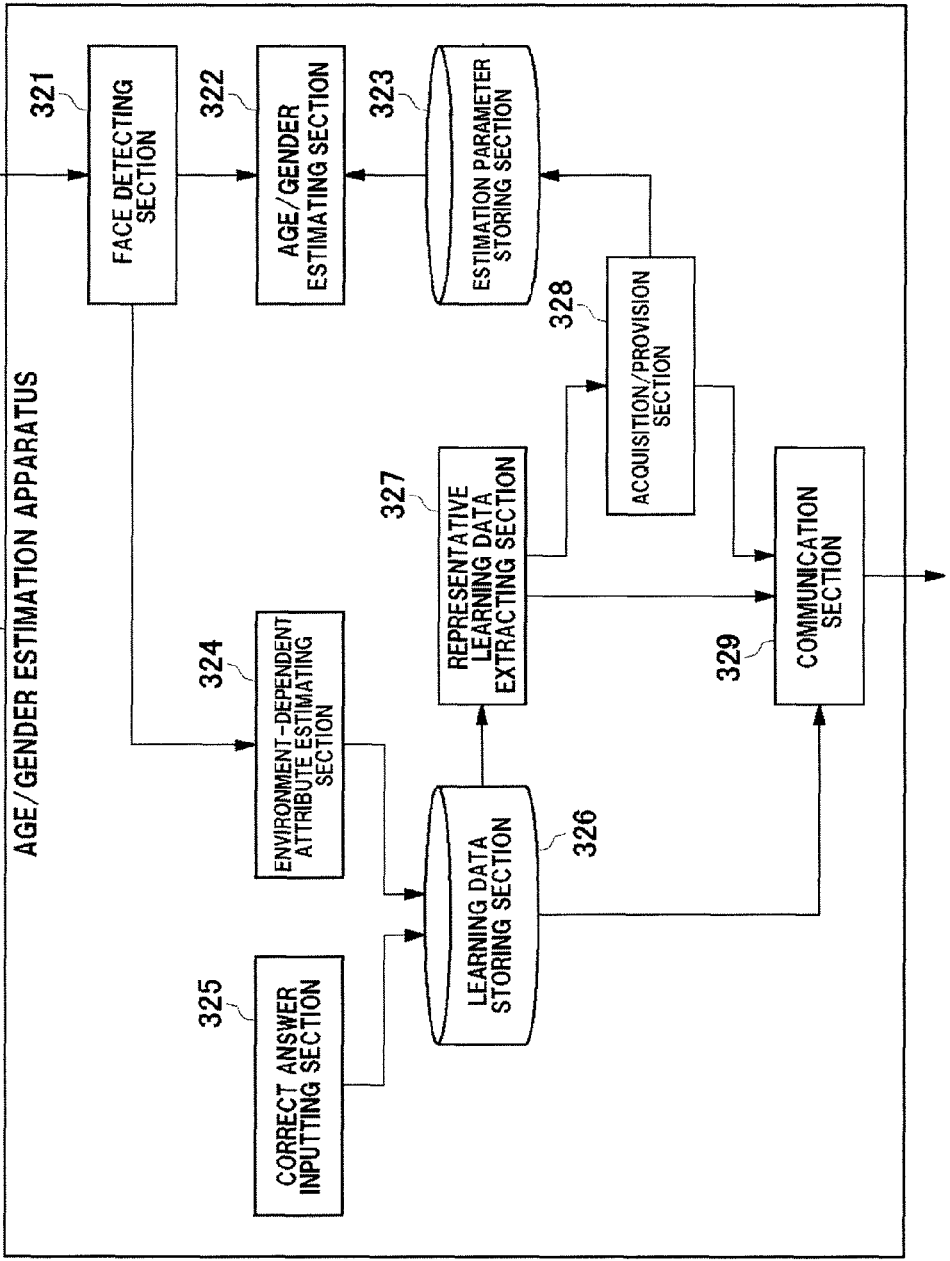
FIG. 15 is a diagram showing the configuration of an age/gender estimation apparatus in the third embodiment of the present invention.

FIG. 15 is a diagram showing the configuration of an age/gender estimation apparatus 32 of this embodiment. The age/gender estimation apparatus 32 in FIG. 15 corresponds to the age/gender estimation apparatuses 32A, 32B, 32C1 and 32C2 in FIG. 14. A configuration for estimating age and gender in the age/gender estimation apparatus 32 is similar to that in the age/gender estimation apparatuses 12 and 22 of the first and second embodiments. That is, a face detecting section 321 detects a face image, and an age/gender estimating section 322 estimates age and gender using estimation parameters stored in an estimation parameter storing section 323.

A configuration for the age/gender estimation apparatus to update estimation parameters with estimation parameters distributed from the parameter distribution server 33 and a configuration for providing information necessary for generation of estimation parameters from the age/gender estimation apparatus to the parameter distribution server 33 will be described below.

(Configuration for Age/Gender Estimation Apparatus to Update Estimation Parameters)

Figure 16:
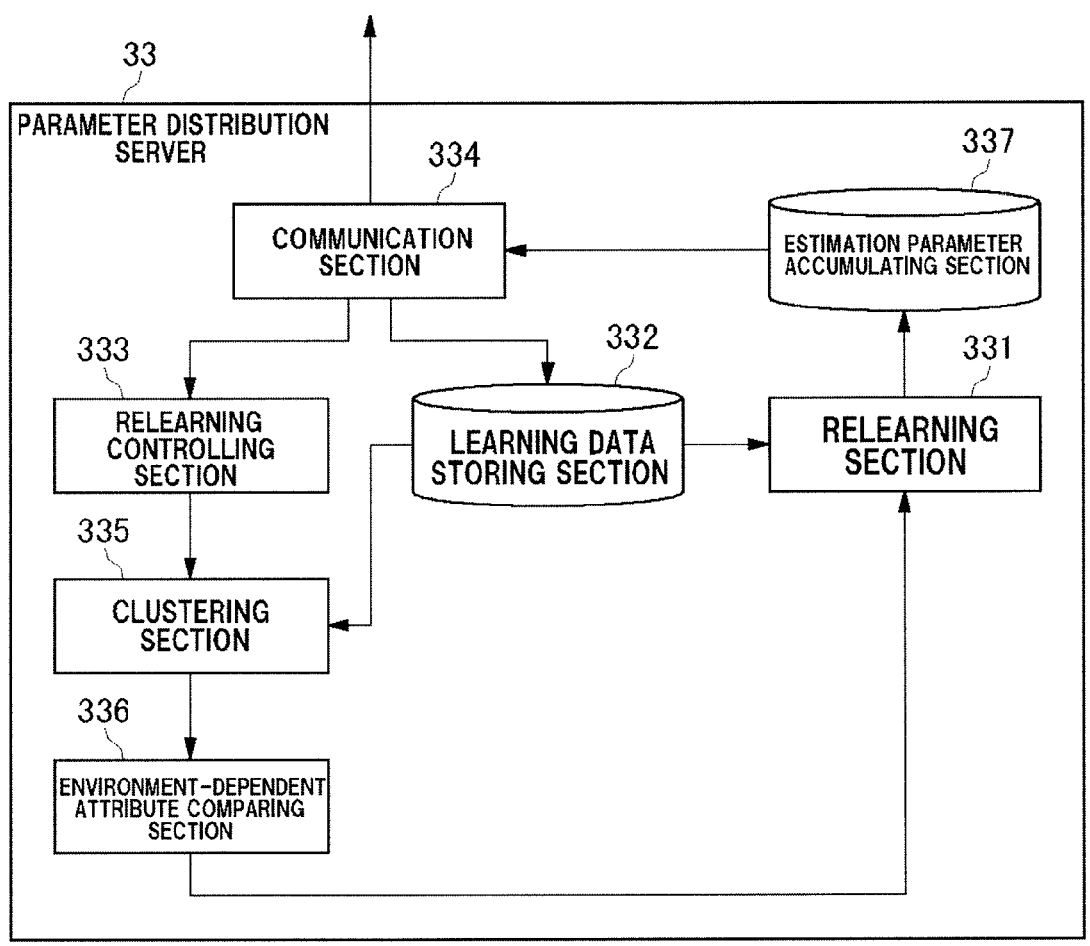
FIG. 16 is a diagram showing the configuration of a parameter distribution server in the third embodiment of the present invention.

FIG. 16 is a diagram showing the configuration of the parameter distribution server 33. The configuration for the age/gender estimation apparatus to update estimation parameters will be described below with reference to FIGS. 15 and 16. When acquiring an image, the face detecting section 321 detects a face from the image, and outputs the face image to an environment-dependent attribute estimating section 324. The environment-dependent attribute estimating section 324 estimates an environment-dependent attribute on the basis of the face image. The environment-dependent attribute in this embodiment is similar to that of the second embodiment. The environment-dependent attribute estimating section 324 outputs the estimated environment-dependent attribute together with the face image to the learning data storing section 326.

A correct answer inputting section 325 receives, for the face image stored in the learning data storing section 326, input of correct answer information about age and gender from the user and outputs it to the learning data storing section 326. The learning data storing section 326 stores the environment-dependent attribute corresponding to the face image outputted from the environment-dependent attribute estimating section 324 and the correct answer information corresponding to the face image outputted from the correct answer inputting section 325 as learning data, associating them with the face image outputted from the environment-dependent attribute estimating section 324.

A representative learning data extracting section 327 extracts representative learning data from the learning data stored in the learning data storing section 326. Normally, a human appears in a monitoring camera for several seconds, multiple image frames are acquired in which the face of the same human is shown. The representative learning data extracting section 327 determines a movement locus of a human when he enters a store using a technique for extracting motion from a time-varying image, gathers multiple image frames of the same human who is coming into a store, into one group, extracts an image with a predetermined size or more showing a face with the least expression which faces almost front in the group, and extracts learning data which includes the face image as representative learning data of the human.

At the time of requesting distribution of estimation parameters, an acquisition/provision section 328 adds a request for the estimation parameters to the representative leaning data extracted by the representative learning data extracting section 327 and outputs it to a communication section 329. The communication section 329 transmits the learning data added with the request for estimation parameters, which has been outputted from the acquisition/provision section 328, to the parameter distribution server 33.

The communication section 329 of the parameter distribution server 33 receives learning data from multiple age/gender estimation apparatuses and outputs the learning data to a learning data storing section 332 and a relearning controlling section 333. In the learning data storing section 332, the learning data acquired from the multiple age/gender estimation apparatuses is stored. The relearning controlling section 333 judges whether or not a request for estimation parameters is added to learning data. If the request for estimation parameters is added, the relearning controlling section 333 outputs the learning data to a clustering section 335 to cause the clustering section 335 to perform clustering of the learning data.

The clustering section 335 performs clustering of the learning data on an environment-dependent attribute space in accordance with control by the relearning controlling section 333. At this time, the clustering is performed by distributing each of the learning data judged by the relearning controlling section 333 to be added with the request for estimation parameters and the learning data stored in the learning data storing section 332 on an environment-dependent attribute space.

An environment-dependent attribute comparing section 336 compares a result of clustering of the learning data judged by the relearning controlling section 333 to be added with the request for estimation parameters, in the environment-dependent attribute space with a result of clustering of the learning data stored in the learning data storing section 332, in the environment-dependent attribute space, and identifies learning data included in a cluster close to a cluster of the learning data added with the request for estimation parameters (within a predetermined distance in the environment-dependent attribute space) among clusters of the learning data stored in the learning data storing section 332. The identified result is outputted to a relearning section 331.

The relearning section 331 reads out the learning data included in the cluster identified by the environment-dependent attribute comparing section 336 and the learning data judged by the relearning controlling section 333 to be added with the request for estimation parameters, from the learning data storing section 332, performs relearning and generates estimation parameters. The generated estimation parameters are accumulated in an estimation parameter accumulating section 337, and the estimation parameters are transmitted to the age/gender estimation apparatus 32 which transmitted the learning data added with the request for estimation parameters, via a communication section 334.

The age/gender estimation apparatus 32 receives the estimation parameters transmitted from the parameter distribution server 33, by the communication section 329. The acquisition/provision section 328 updates estimation parameters stored in the estimation parameter storing section 323, with the received estimation parameters.

(Configuration for Providing Learning Data from Age/Gender Estimation Apparatus to Parameter Distribution Server)

When operation is started in the age/gender estimation apparatus 32, the face detecting section 321 detects a face image from an acquired image. The environment-dependent attribute estimating section 324 estimates an environment-dependent attribute from the face image as described above, and the correct answer inputting section 325 receives input of correct answer information as described above. The learning data storing section 326 stores learning data constituted by the face image, the environment-dependent attribute and the correct answer information as described above. The representative learning data extracting section 327 extracts learning data to be a representative, from the learning data storing section 326 similarly to the above description.

In the case of providing image data for the other age/gender estimation apparatuses without requesting estimation parameters as described above, the learning data extracted by the representative learning data extracting section 327 is immediately transmitted to the parameter distribution server 33 via the communication section 329.

The parameter distribution server 33 receives this learning data by the communication section 334 and stores it into the learning data storing section 332. The received learning data is outputted to the relearning controlling section 333 also. The relearning controlling section 333 judges whether or not the learning data is added with a request for estimation parameters. In this case, the request for estimation parameters is not added, and, therefore, the relearning controlling section 333 does not perform relearning.

Figure 17:
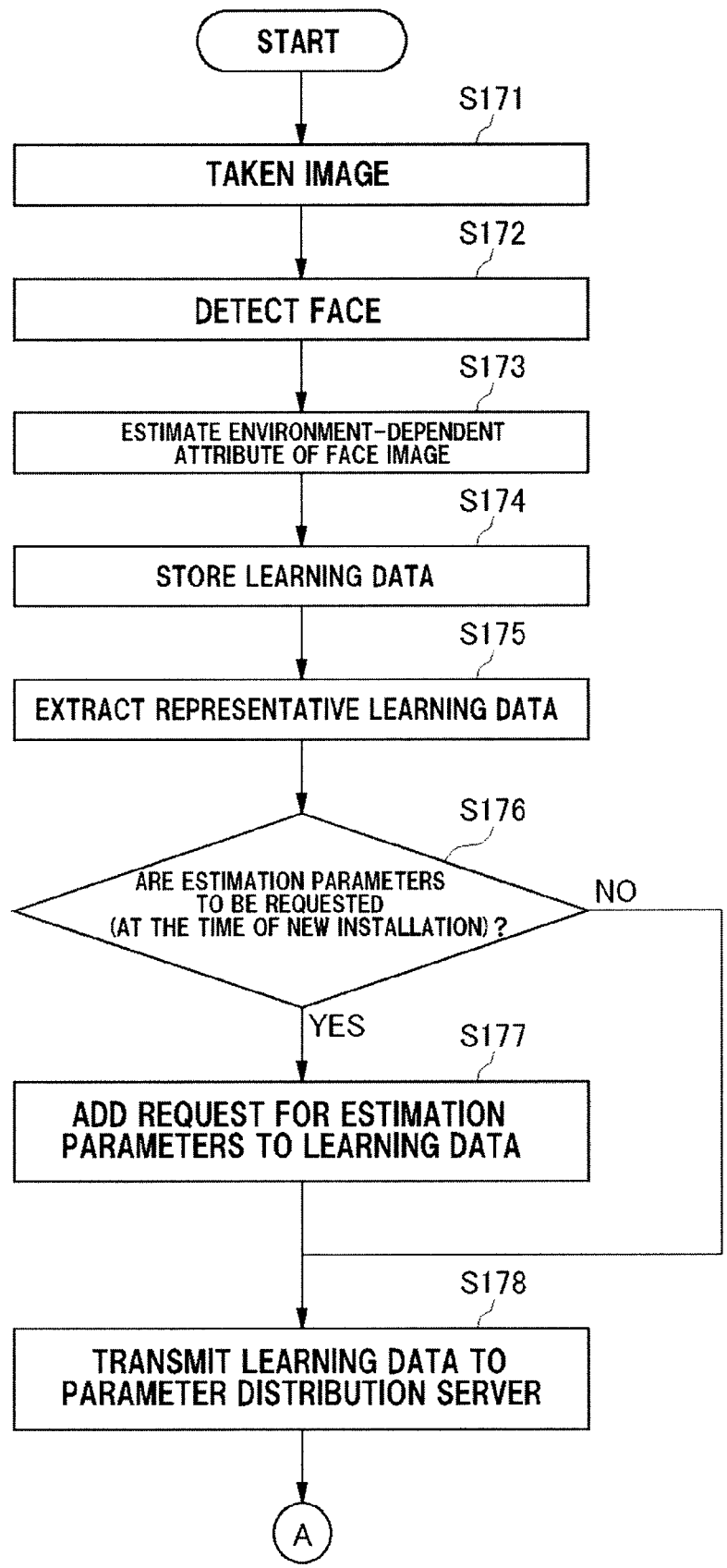
FIG. 17 is a flowchart of a process in the age/gender estimation system of the third embodiment of the present invention.
Figure 18:
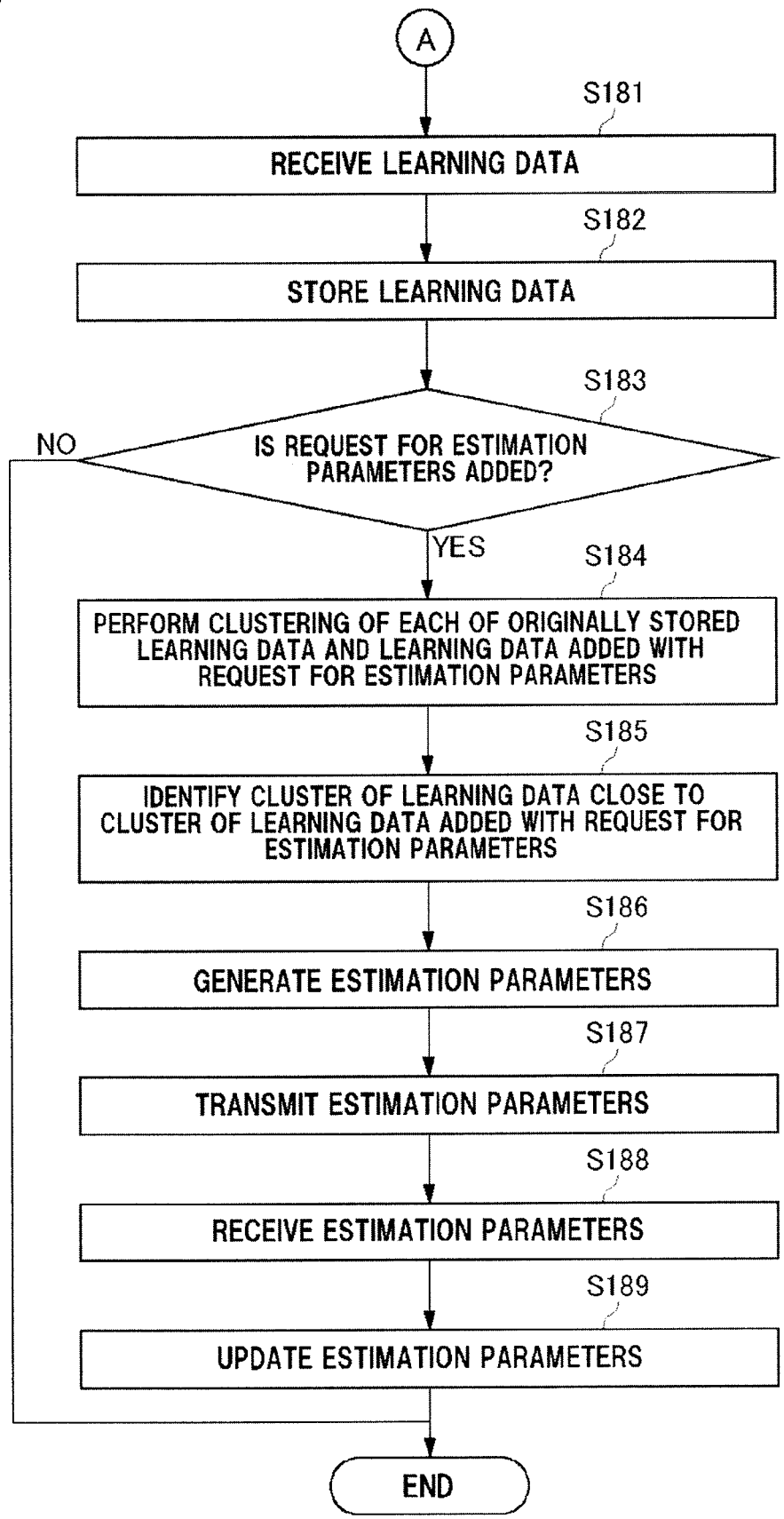
FIG. 18 is a flowchart of the process in the age/gender estimation system of the third embodiment of the present invention.

FIGS. 17 and 18 are a flowchart of a process in the age/gender estimation system 30 of the third embodiment. First, in order to generate learning data accompanied by a request for estimation parameters, multiple images are taken in a state that a monitoring camera 31 is installed (step S171). The face detecting section 321 detects faces from the images and outputs face images to the environment-dependent attribute estimating section 324 and the learning data storing section 326 (step S172).

The environment-dependent attribute estimating section 324 estimates environment-dependent attributes of the face images detected by the face detecting section 321 (step S173). For each of the face images, the correct answer inputting section 325 accepts a correct answer input for age and gender, and stores it into the learning data storing section 326 together with the face image concerned and an environment-dependent attribute estimated about the face image as learning data (step S174). The representative learning data extracting section 327 extracts representative learning data from among the learning data stored in the learning data storing section 326 (step S175).

Next, the representative learning data extracting section 327 judges whether or not to request estimation parameters (step S176). In the case of requesting estimation parameters (step S176: YES) when the monitoring camera 31 and the age/gender estimation apparatus 32 are newly installed, the representative learning data extracting section 327 outputs the extracted learning data to the acquisition/provision section 328, the acquisition/provision section 328 adds a request for estimation parameters to the learning data and outputs the learning data to the communication section 329 (step S177), and the communication section 329 transmits the learning data added with the request for estimation parameters to the parameter distribution server 33 (step S178). In the case of not requesting estimation parameters (step S176: NO), the representative learning data extracting section 327 outputs the extracted learning data to the communication section 329, and the communication section 329 transmits the learning data to the parameter distribution server 33 (step S178).

The communication section 334 of the parameter distribution server 33 receives the learning data and outputs it to the learning data storing section 332 and the relearning controlling section 333 (step S181). The learning data storing section 332 stores the learning data (step S182). The relearning controlling section 333 judges whether or not the learning data is added with a request for estimation parameters (step S183).

If the learning data is added with a request for estimation parameters (step S183: YES), the clustering section 335 distributes each of learning data originally stored in the learning data storing section 332 and the learning data added with the request for estimation parameters in an environment-dependent attribute space and performs clustering (step S184). If the learning data is not added with a request for estimation parameters (step S183: NO), the process immediately ends.

The environment-dependent attribute comparing section 336 compares the distribution of the learning data added with the request for estimation parameters with the distribution of the learning data originally stored in the learning data storing section 332 in the environment-dependent attribute space, and identifies a cluster close to a cluster of the learning data added with the request for estimation parameters, among clusters of the learning data originally stored in the learning data storing section 332 (step S185).

Next, the relearning section 331 generates estimation parameters using the learning data identified by the environment-dependent attribute comparing section 336 among the learning data originally stored in the learning data storing section 332 and the learning data added with the request for estimation parameters, and accumulates the estimation parameters in the estimation parameter accumulating section 337 (step S186). Then, the communication section 334 transmits the generated estimation parameters to the age/gender estimation apparatus 32 (step S187).

The communication section 329 of the age/gender estimation apparatus 32 receives the estimation parameters transmitted from the parameter distribution server 33 (step S188). The acquisition/provision section 328 updates estimation parameters stored in the estimation parameter storing section 323 with the received estimation parameters (step S189).

As described above, according to the age/gender estimation system 30 of the third embodiment, the age/gender estimation apparatus 32 installed in each store can receive estimation parameters corresponding to its environment-dependent attribute from the parameter distribution server 33 by transmitting learning data to the parameter distribution server 33. Furthermore, since it is not necessary to generate estimation parameters by relearning in each store, a configuration required for each store can be simplified.

[Fourth Embodiment]

The basic configuration of an age/gender estimation system 40 of a fourth embodiment of the present invention is the same as that of the age/gender estimation system 30 of the third embodiment shown in FIG. 14. In this embodiment, configurations of an age/gender estimation apparatus 42 and a parameter distribution server 43 are different from the third embodiment.

Figure 19:
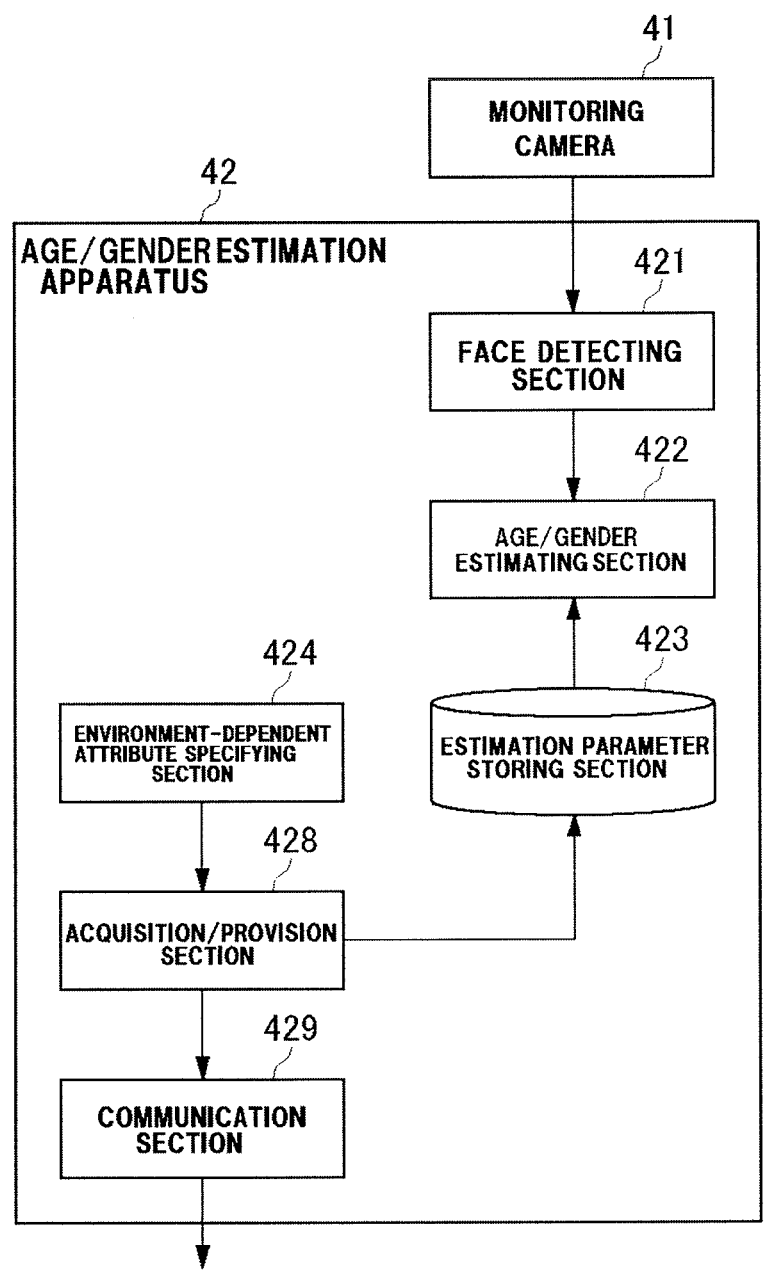
FIG. 19 is a diagram showing the configuration of an age/gender estimation apparatus in a fourth embodiment of the present invention.

FIG. 19 is a diagram showing the configuration of the age/gender estimation apparatus of the fourth embodiment. In the age/gender estimation apparatus of this embodiment, a configuration for estimating age and gender is similar to that of the third embodiment. That is, a face detecting section 421 detects a face image, an age/gender estimating section 422 estimates age and gender using estimation parameters stored in an estimation parameter storing section 423.

An environment-dependent attribute specifying section 424 receives specification of an environment-dependent attribute of a monitoring camera 41 from the user and stores it. In this embodiment, the environment-dependent attribute is a face direction (horizontal and vertical directions) when a human to be photographed by a monitoring camera 41 is facing front. When installing the monitoring camera 41, the user specifies the direction of the face of a human facing front relative to the monitoring camera 41 as an environment-dependent attribute by inputting each of the horizontal and vertical angles to the environment-dependent attribute specifying section 124 according to the installation state.

The acquisition/provision section 428 generates a request for estimation parameters, adds the request to the environment-dependent attribute specified by the environment-dependent attribute specifying section 424 and outputs it to a communication section 429. The communication section 429 transmits the environment-dependent attribute added with the request for estimation parameters to a parameter distribution server 43.

Figure 20:
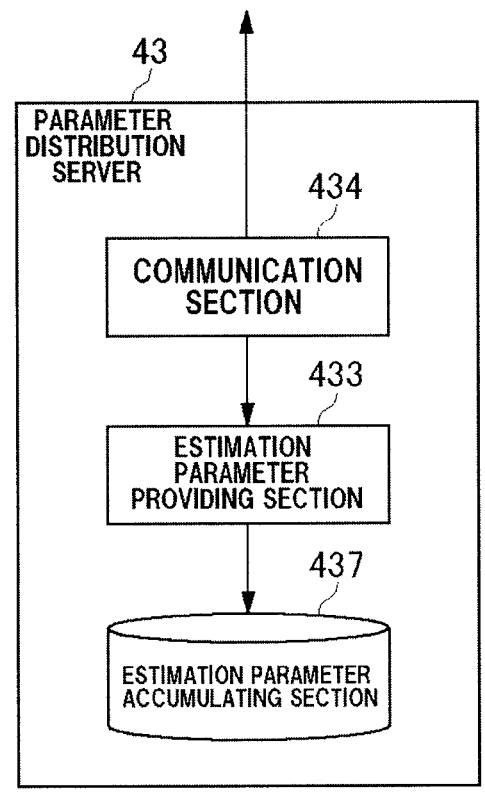
FIG. 20 is a diagram showing the configuration of a parameter distribution server in the fourth embodiment of the present invention.

FIG. 20 is a diagram showing the configuration of the parameter distribution server 43 of the fourth embodiment. The parameter distribution server 43 is provided with a communication section 434, an estimation parameter providing section 433 and an estimation parameter accumulating section 437. In the estimation parameter accumulating section 437, an estimation parameter corresponding to each environment-dependent attribute is accumulated in advance.

The communication section 434 receives the environment-dependent attribute added with the request for estimation parameters from the age/gender estimation apparatus 42. The estimation parameter providing section 433 reads out estimation parameters corresponding to the environment-dependent attribute added with the request for estimation parameters received by the communication section 434, from the estimation parameter accumulating section 437 and outputs the estimation parameters to the communication section 434. The communication section 434 transmits the estimation parameters which the estimation parameter providing section 433 has read out from the estimation parameter accumulating section 437, to the age/gender estimation apparatus 42.

The communication section 429 of the age/gender estimation apparatus 42 receives the estimation parameters transmitted from the parameter distribution server 43 and outputs them to the acquisition/provision section 428. The acquisition/provision section 428 updates estimation parameters stored in the estimation parameter storing section 423 with the estimation parameters received by the communication section 429.

Figure 21:
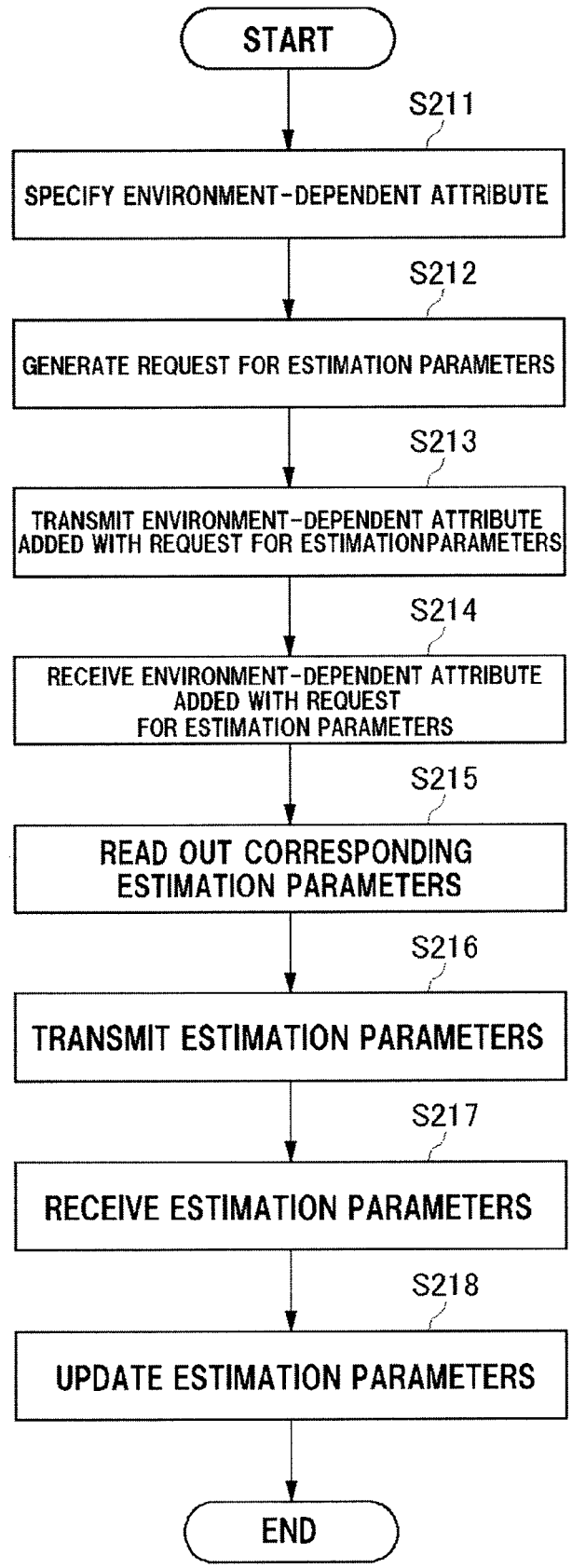
FIG. 21 is a flowchart of a process in the age/gender estimation system of the fourth embodiment of the present invention.

FIG. 21 is a flowchart of a process in the age/gender estimation system 40 of the fourth embodiment. This process flow is executed when the monitoring camera 41 and the age/gender estimation apparatus 42 are newly installed. First, the user specifies an environment-dependent attribute in the environment-dependent attribute specifying section 424 in accordance with the installation state of the monitoring camera 41 (step S211). Next, the acquisition/provision section 428 generates a request for estimation parameters and adds the request to the environment-dependent attribute specified by the environment-dependent attribute specifying section 424 (step S212). Then, the communication section 429 transmits the environment-dependent attribute added with the request for estimation parameters (step S213).

When the communication section 434 receives the environment-dependent attribute added with the request for estimation parameters from the age/gender estimation apparatus 42 (step S214), the estimation parameter providing section 433 reads out estimation parameters corresponding to the environment-dependent attribute from the estimation parameter accumulating section 437 (step S215). Then, the communication section 434 transmits the estimation parameters which the estimation parameter providing section 433 has read out from the estimation parameter accumulating section 437, to the age/gender estimation apparatus 42 (step S216).

Next, the communication section 429 of the age/gender estimation apparatus 42 receives the estimation parameters transmitted from the parameter distribution server 43 (step S217). Then, the acquisition/provision section 428 updates estimation parameters stored in the estimation parameter storing section 423 with the received estimation parameters (step S218).

As described above, according to the age/gender estimation system 40 of the fourth embodiment, the age/gender estimation apparatus 42 in each store can receive estimation parameters corresponding to the environment-dependent attribute from the parameter distribution server 43 by specifying an environment-dependent attribute and transmitting it to the parameter distribution server 43. Furthermore, since it is not necessary for the age/gender estimation apparatus 42 in each store to generate estimation parameters by relearning, a configuration in each store can be simplified.

[Fifth Embodiment]

Next, an age/gender estimation system of a fifth embodiment of the present invention will be described. In the fifth embodiment also, a cooperation system is configured by multiple age/gender estimation systems cooperating with one another, similarly to the above embodiments. In the age/gender estimation system 20 of the second embodiment, multiple test images are taken and test learning data is generated, and learning data close to the test learning data in an environment-dependent attribute space is supplemented as learning data obtained in an environment close to the photographing environment of the test images. At that time, in the second embodiment, as shown in FIG. 8, an environment-dependent attribute space is defined utilizing a Gabor feature value as it is, and the similarity of the photographing environment within the space is determined.

However, a Gabor feature value is a feature value with an extremely high number of dimensions that mainly indicates general features of a face, and hence a Gabor feature value also includes various features other than features that relate to the environment. Accordingly, when an environment-dependent attribute space for determining the similarity of photographing environments (the similarity of learning data to be supplemented) is defined utilizing a Gabor feature value as it is, it is not necessarily the case that data items having photographing environments close to each other exist close to each other in the space with a good degree of accuracy.

Therefore, according to this embodiment, as a variation of the second embodiment, an age/gender estimation system is described that improves the accuracy and efficiency of extracting learning data having similar photographing environments. The age/gender estimation system of this embodiment generates an environment-dependent attribute space in which data of the same environment is classified into smaller clusters and data of differing environments is classified into clearly different clusters, and improves the accuracy and efficiency of extracting learning data in which a photographing environment is similar by retrieving data in which photographing environments are close to each other in such an environment-dependent attribute space.

Figure 22:
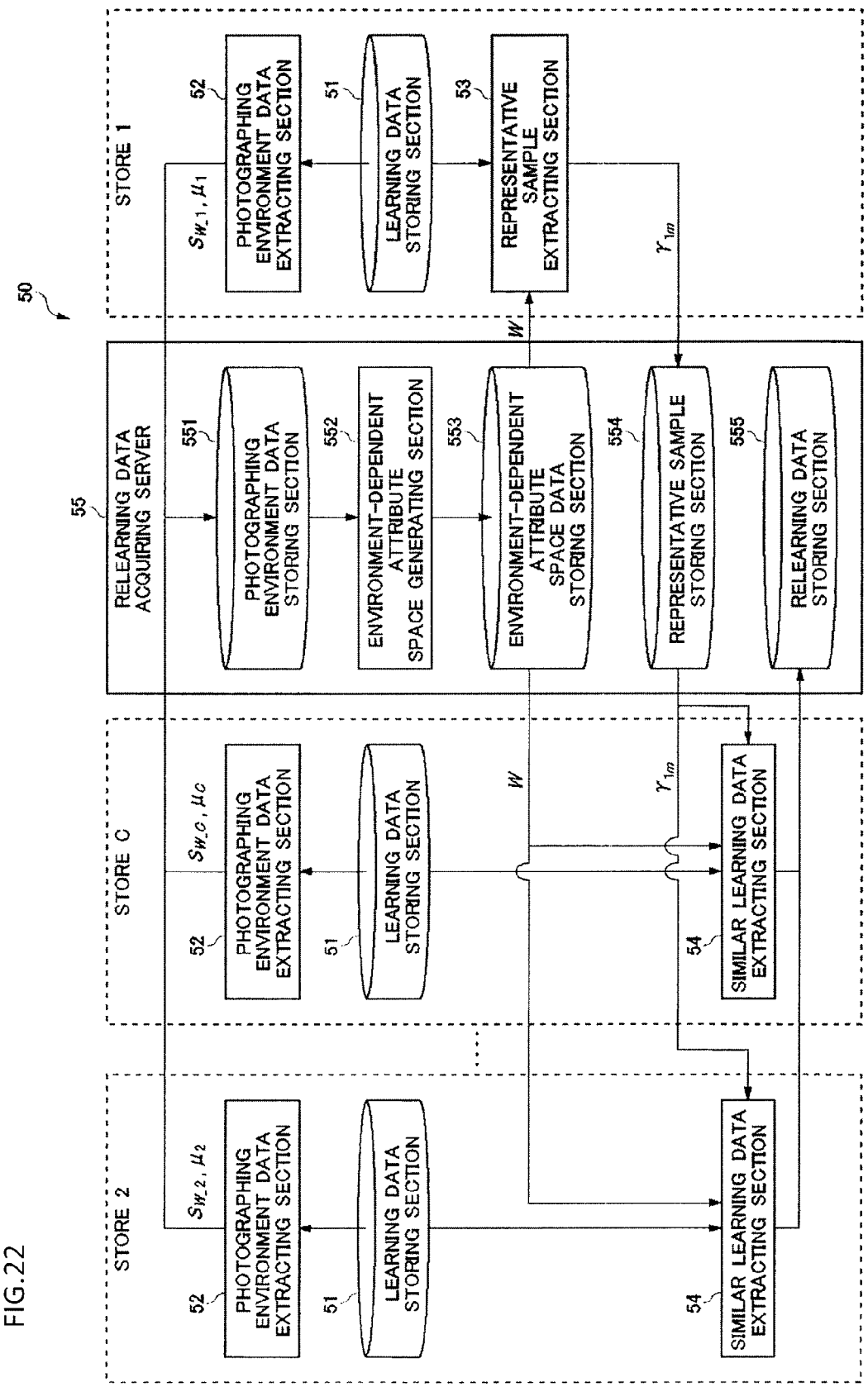
FIG. 22 is a diagram showing the configuration of an age/gender estimation system in a fifth embodiment of the present invention.

FIG. 22 is a diagram showing the configuration of the age/gender estimation system of this embodiment. As shown in FIG. 22, an age/gender estimation system 50 of this embodiment is provided with apparatuses installed in stores 1 to C, respectively, and a relearning data acquiring server 55. Although, as in the second embodiment, the respective apparatuses installed in each store include a monitoring camera, an age/gender estimation apparatus, and a relearning control server, FIG. 22 shows only the configuration that is necessary for describing this embodiment. Further, FIG. 22 shows a configuration that allows a relearning server of the store 1 to acquire relearning data from stores 2 to C. Here, reference symbol "C" represents a natural number and shows the number of stores (number of learning data storing sections 51) included in the age/gender estimation system 50.

In each store, a learning data storing section 51, a photographing environment data extracting section 52, a representative sample extracting section 53, and a similar learning data extracting section 54 are installed. Since FIG. 22 is a view for describing an example in which learning data of another store is acquired by the store 1, illustration of the similar learning data extracting section 54 of the store 1 and illustration of the representative sample extracting section 53 of the stores 2 to C is omitted.

The learning data storing section 51 of each store stores learning data of multiple face images that are respectively detected from multiple images photographed by the monitoring camera of the relevant store. The learning data is a combination of a feature value of each face image and correct answer information. According to this embodiment, the feature value of a face image is a Gabor feature value. The feature value of a face image may be another feature value. Even in the case of another feature value, similarly to the case of a Gabor feature value, if the feature value is a general face feature value and the face feature value is not necessarily a feature value suitable for distinctly expressing a difference in photographing environments, it is effective to project such a face feature value onto an environment-dependent attribute space in the following manner according to this embodiment. Further, with respect to a feature value with a high number of dimensions, such as a Gabor feature value, the number of dimensions can be decreased by projecting the feature value onto an environment-dependent attribute space in the manner described hereunder. Hence, a processing load for detecting learning data in which photographing environments are similar to each other can be reduced. This is described specifically hereunder.

From each face image that is stored in the learning data storing section 51, the photographing environment data extracting section 52 of each store extracts a mean $mu_i$ and a covariance $S_{W\_i}$ of Gabor feature values in each face image as photographing environment data. More specifically, the photographing environment data extracting section 52 determines the mean $mu_i$ using equation (1) below, and determines the covariance $S_{W\_i}$ using equation (2) below.

[Equation 1]

$$\mu_i = \frac{1}{N_i} \sum_{j=1}^{N_i} x_{ij} \quad (1)$$

[Equation 2]

$$S_{W\_i} = \sum_{j=1}^{N_i} (x_{ij} - \mu_i)(x_{ij} - \mu_i)^T \quad (2)$$

Here, $X_{ij}$ denotes a Gabor feature value, i denotes a learning data number, j denotes a sample number within learning data i, and $N_i$ denotes a number of the learning data i.

The photographing environment data extracted by the photographing environment data extracting section 52 of each store is transmitted to the relearning data acquiring server 55 through a network. The relearning data acquiring server 55 is provided with a photographing environment data storing section 551. The photographing environment data storing section 551 stores the photographing environment data ($S_{W\_i}$, $mu_i$) that has been extracted and transmitted by the photographing environment data extracting section 52 of each store, separately for each store.

The relearning data acquiring server 55 is further provided with an environment-dependent attribute space generating section 552, an environment-dependent attribute space data storing section 553, a representative sample storing section 554, a relearning data storing section 555, and a learning data selecting section 556.

The environment-dependent attribute space generating section 552 generates a feature space that best expresses differences of respective photographing environments based on photographing environment data that is stored in the photographing environment data storing section 551. Specifically, the environment-dependent attribute space generating section 552 first calculates a covariance matrix $S_W$ within a photographing environment using the following equation (3).

[Equation 3]

$$S_W = \frac{1}{C}\sum_{i=1}^{C} S_{W\_i} \quad (3)$$

Further, the environment-dependent attribute space generating section 552 calculates a covariance matrix $S_B$ between photographing environments using the following equation (4).

[Equation 4]

$$S_B = \sum_{i=1}^{C} (\mu_i - \mu)(\mu_i - \mu)^T \quad (4)$$

Here, mu in equation (4) is obtained by the following equation (5).

[Equation 5]

$$\mu = \frac{1}{N}\sum_{i=1}^{C} N_i \mu_i \quad (5)$$

Subsequently, the environment-dependent attribute space generating section 552 determines a base vector W that represents a feature space by solving the following equation (6).

[Equation 6]

$$W = \mathrm{argmax}\frac{|W^T S_B W|}{|W^T S_W W|} \quad (6)$$

Upon determining the base vector W in the above described manner, the environment-dependent attribute space generating section 552 stores the base vector W in the environment-dependent attribute space data storing section 553 as environment-dependent attribute space data.

The representative sample extracting section 53 of the store 1 acquires the environment-dependent attribute space data W that has been generated and stored in the environment-dependent attribute space data storing section 553 by the environment-dependent attribute space generating section 552 of the relearning data acquiring server 55, and extracts a small number of representative samples that effectively represent a photographing environment of face images stored in the learning data storing section 51 with respect to a feature space represented by the environment-dependent attribute space data W. Specifically, the representative sample extracting section 53 of the store 1 extracts representative samples by the following procedure.

First, using the environment-dependent attribute space data W, the representative sample extracting section 53 projects each Gabor feature value $X_{1,j}$ onto the environment-dependent attribute space. When this is expressed as an equation, the following equation (7) is obtained.

[Equation 7]

$$y_{1j} = W^T x_{1j} \quad (7)$$

Next, using the k-means method or the EM method, the representative sample extracting section 53 performs clustering of samples $y_{1j}$ (j=1 to $N_1$) after projection, and extracts $M_1$ representative samples of each cluster. In this connection, $M_1$ is determined in advance as a value that is sufficiently smaller than $N_1$. Thus, representative samples $r_{1m}$ (m=1 to $M_1$) are obtained.

The representative sample extracting section 53 transmits the representative samples $r_{1m}$ to the relearning data acquiring server 55, and the relearning data acquiring server 55 stores the representative samples $r_{1m}$ in the representative sample storing section 554. The similar learning data extracting sections 54 of the stores 2 to C that are candidates for providing learning data to the store 1 acquire the environment-dependent attribute space data W stored in the environment-dependent attribute space data storing section 553 of the relearning data acquiring server 55 and the representative samples $r_{1m}$ of the store 1 that are stored in the representative sample storing section 554 of the relearning data acquiring server 55. The similar learning data extracting sections 54 of the stores 2 to C extract similar learning data that is close to the representative samples $r_{1m}$ in the feature space represented by the environment-dependent attribute space data W. Specifically, the respective similar learning data extracting sections 54 extract similar learning data by the following procedure.

First, using the environment-dependent attribute space data W, the relevant similar learning data extracting section 54 projects each Gabor feature value $x_{ij}$ (j=2 to C) onto the environment-dependent attribute space. When this is expressed as an equation, the following equation (8) is obtained.

[Equation 8]

$$y_{ij} = W^T x_{ij} \quad (8)$$

Next, the similar learning data extracting section 54 extracts a sample for which a distance from a Gabor feature value to a sample among the representative samples $r_{1m}$ (m=1 to $M_1$) of the store 1 that are stored in the representative sample storing section 554 is less than or equal to a certain value as similar learning data that is close to a representative sample.

The similar learning data extracting sections 54 transmit the extracted similar learning data to the relearning data acquiring server 55. If similar learning data has not been extracted, the relevant similar learning data extracting section 54 sends a notification to that effect to the relearning data acquiring server 55. The relearning data acquiring server 55 stores similar learning data acquired from the respective similar learning data extracting sections 54 of the stores 2 to C in the relearning data storing section 555 as relearning data for the store 1. At the store 1, relearning is performed using the relearning data that is stored in the relearning data storing section 555. A configuration for performing the aforementioned relearning is omitted from FIG. 22.

Figure 23:
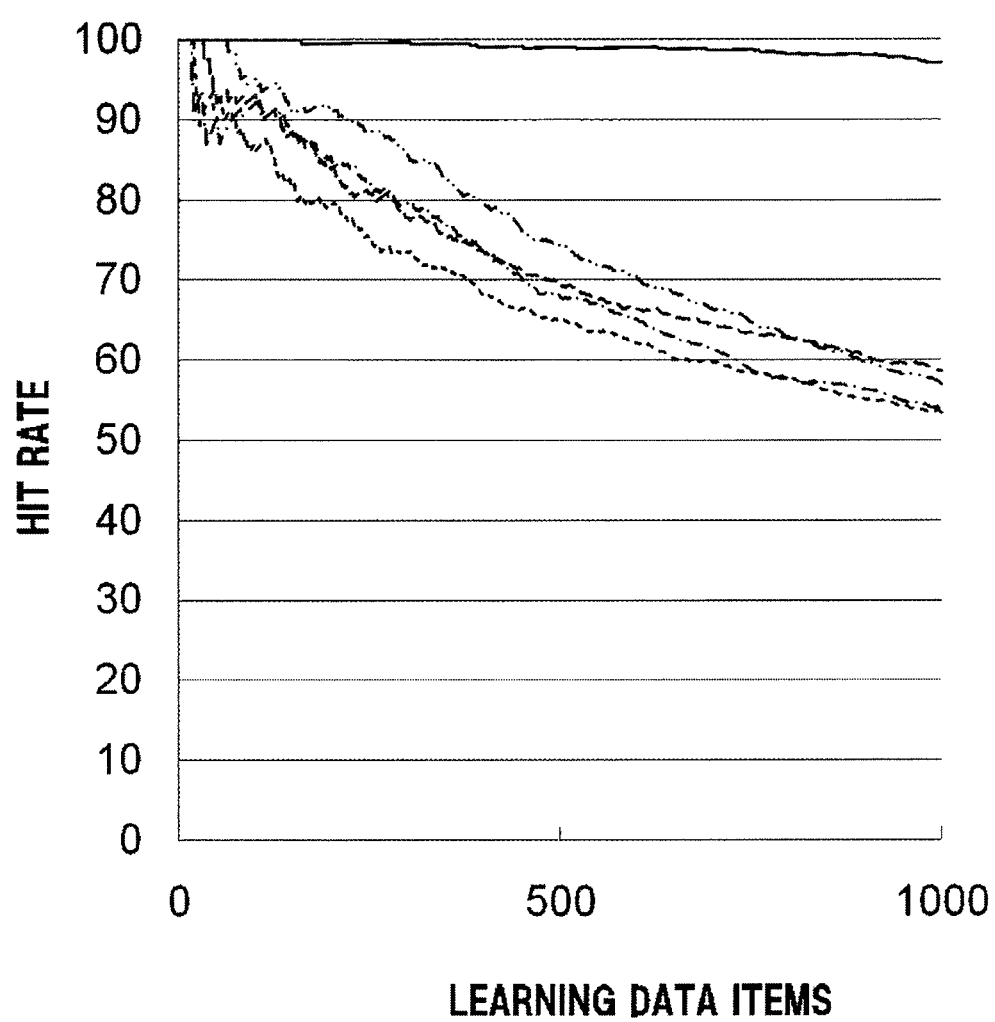
FIG. 23 is a graph that shows, in a case of acquiring relearning data in a certain store in the fifth embodiment of the present invention, a percentage (hit rate) at which relearning data could be extracted from a store having a photographing environment similar to the certain store.

FIG. 23 is a graph that shows, in a case of acquiring relearning data in a certain store, a percentage (hit rate) at which relearning data could be extracted from a store having a photographing environment similar to the certain store. In FIG. 23, dashed lines and chain lines show hit rates for a case where, as in the second embodiment, an environment-dependent attribute space is defined utilizing a Gabor feature value as it is and a similarity of a photographing environment within the space is determined, and a solid line shows a hit rate in a case where an environment-dependent attribute space is generated according to this embodiment and a similarity of a photographing environment within the space is determined.

As shown in FIG. 23, in the case of the second embodiment the hit rate falls rapidly as the number of items of learning data increases, in contrast, according to this embodiment the hit rate is maintained at a high level even when the number of items of learning data increases. That is, by extracting representative samples and extracting similar learning data using the base vector W that converts a Gabor feature value with which a difference in a photographing environment becomes noticeable into a feature value, as in this embodiment, a high hit rate can be maintained even if the number of items of learning data increases.

Further, according to this embodiment, in the similar learning data extracting section 54, since the Gabor feature value is converted using the base vector W, a feature value that is used to determine a similarity becomes smaller, and a processing load for determining a similarity is reduced.

Figure 24:
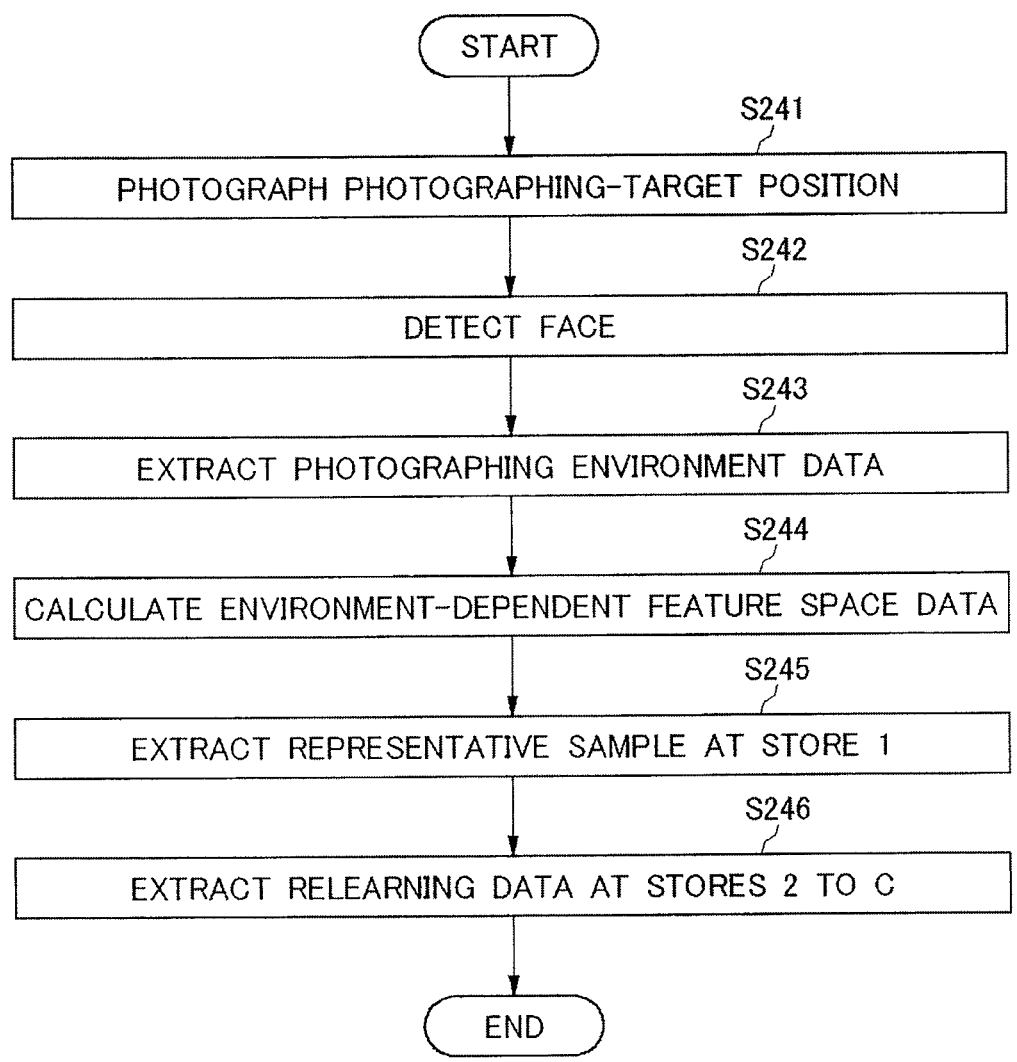
FIG. 24 is a flowchart of a process in the age/gender estimation system of the fifth embodiment of the present invention.

FIG. 24 is a flowchart of a process in the age/gender estimation system 30 of the fifth embodiment of the present invention. Similarly to FIG. 22, FIG. 24 illustrates a process when acquiring relearning data at the store 1. First, multiple images are taken in a state in which a monitoring camera is installed in each of the stores 1 to C (step S241). Next, faces are detected from the images, and Gabor feature values of the respective face images are stored in the learning data storing section 51 together with correct answer information (step S242).

The photographing environment data extracting section 52 extracts the mean $mu_i$ and the covariance $S_{W\_i}$ of the Gabor feature values stored in the learning data storing section 51, and transmits the extracted mean $mu_i$ and covariance $S_{W\_i}$ to the relearning data acquiring server 55 as photographing environment data (step S243). The environment-dependent attribute space generating section 552 of the relearning data acquiring server 55 calculates the base vector (environment-dependent attribute space data) W that represents a feature space using the photographing environment data collected from each store (step S244).

The representative sample extracting section 53 of the store 1 extracts a small number of representative samples $r_{1m}$ within the environment-dependent attribute space represented by the environment-dependent attribute space data W using the k-means method or the like, and transmits the extracted representative samples $r_{1m}$ to the relearning data acquiring server 55 (step S245). The similar learning data extracting sections 54 of the stores 2 to C acquire the representative samples $r_{1m}$ of the store 1 from the relearning data acquiring server 55, extract learning data close to the representative samples $r_{1m}$ in the environment-dependent attribute space represented by the environment-dependent attribute space data W as relearning data, and transmit the relearning data to the relearning data acquiring server 55 (step S246).

As described above, according to this embodiment, a feature space is generated so that learning data of similar photographing environments are close to each other and learning data of differing photographing environments are far from each other, and learning data of another store in which the photographing environment is similar within the feature space is extracted as relearning data. Hence, the accuracy and efficiency of extracting relearning data increase.

[Variations]

The first to fifth embodiments have been described. However, embodiments of the present invention are not limited thereto, and various variations are possible. Variations will be described below.

(Timing of Relearning)

In the above embodiments, relearning is performed at the time of newly installing the age/gender estimation system 10 or 20 (the first or second embodiment), or the monitoring camera 31 or 41 and the age/gender estimation apparatus 32 or 42 (the third or fourth embodiments). However, relearning may be performed after start of operation. In this case, the relearning control server 13 or 23 in the first or second embodiment, or the parameter distribution server 33 or 43 in the third or fourth embodiment is provided with a necessity-of-relearning judging section.

For example, the necessity-of-relearning judging section controls a necessary configuration so that relearning is performed when a predetermined number of or more faces with a low degree of conviction are acquired through all generations as a result of estimation. In this case, since there is a possibility that the correct answer rate is low, it is expected that the accuracy of estimation is improved by updating estimation parameters by relearning. The degree of conviction is a value to be outputted by the age/gender estimation apparatus. Comparing the age/gender estimation apparatus to a human, the age/gender estimation apparatus is adapted to output a high degree of conviction when it is confident in an estimation result and a low degree of conviction when it is not confident in an estimation result. In a method using a statistical model, likelihood can be used as the degree of conviction. In a method using clustering, a distance from a cluster border can be used as the degree of conviction.

Figure 25:
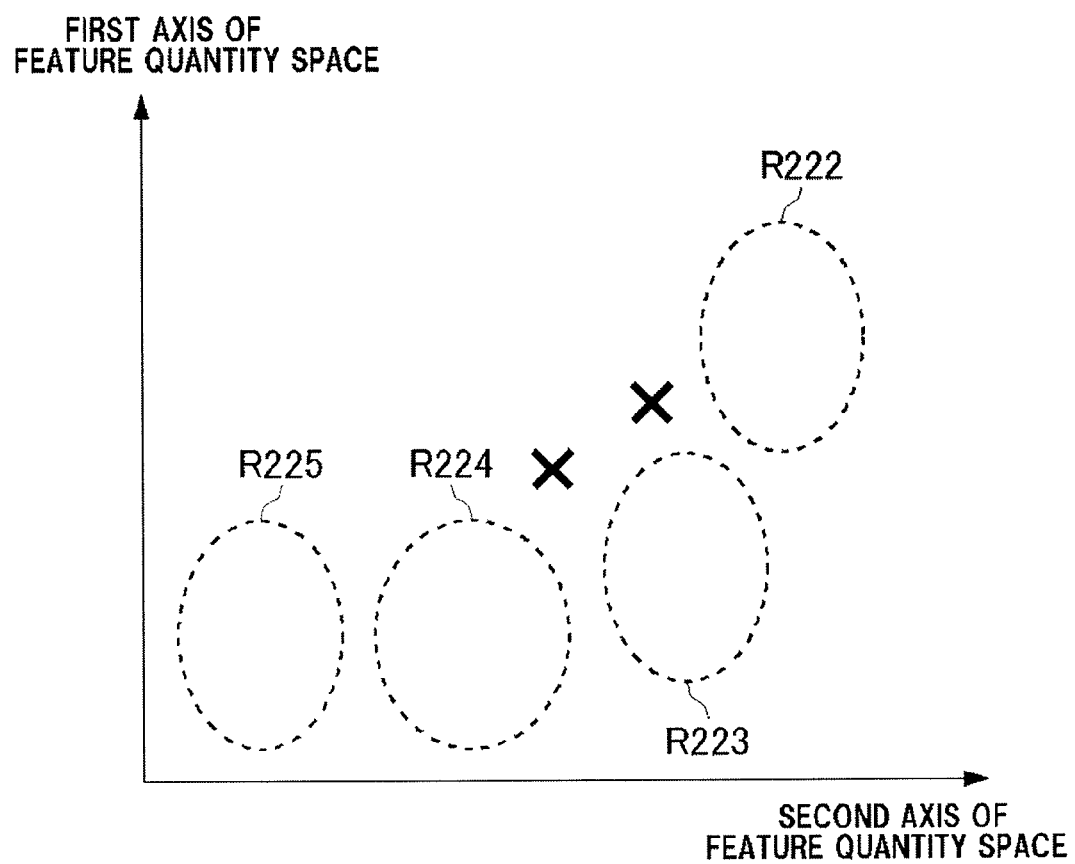
FIG. 25 is a diagram showing a feature quantity space for estimation of age in a variation embodiment of the present invention.

FIG. 25 is a diagram showing a feature quantity space for estimation of age. If, in the case where an area R222 of face images estimated to be in the twenties, an area R223 of face images estimated to be in the thirties, an area R224 of face images estimated to be in the forties and an area R225 of face images estimated to be in the fifties are arranged in a feature quantity space as shown in FIG. 25, a predetermined number of or more face images which do not belong to any of the areas, like those indicated by "X", are acquired, the necessity-of-relearning judging section judges that relearning is necessary.

The necessity-of-relearning judging section can also judge that relearning is necessary when a predetermined number of or more face images which are away from the center of each generation cluster of learning images by a threshold or more are acquired in an environment-dependent attribute space. In this case, since there is a possibility that the environment has changed due to change in layout of articles and the like in a store, it is expected that the accuracy of estimation is improved by updating estimation parameters by relearning.

Figure 26:
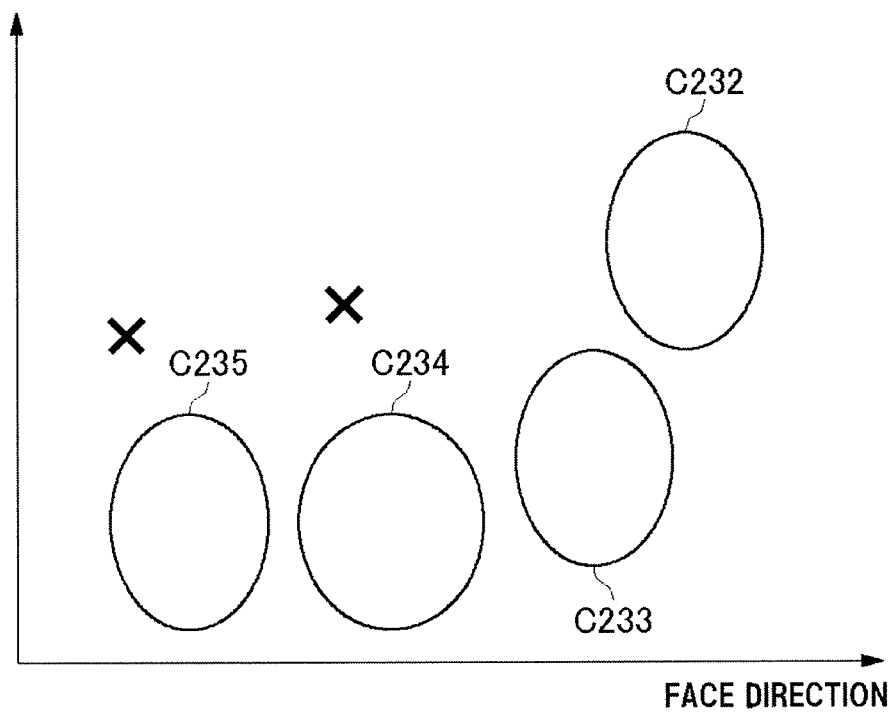
FIG. 26 is a diagram showing an environment-dependent attribute space in the variation embodiment of the present invention.

FIG. 26 is a diagram showing an environment-dependent attribute space. If a predetermined number of or more face images which do not belong to any of a cluster C232 of learning images in the twenties, a cluster C233 of learning images in the thirties, a cluster C234 of learning images in the forties and a cluster C235 of learning images in the fifties at the time of distributing learning data in an environment-dependent attribute space (which are far away from any of the learning images), like those indicated by "X", are acquired as shown in FIG. 26, the necessity-of-relearning judging section judges that relearning is necessary.

When difference between a statistic of learning images and a statistic of acquired face images is a predetermined threshold or above in an environment-dependent attribute space, the necessity-of-relearning judging section may also judge that relearning is necessary. In this case, since there is a possibility that the environment has changed due to change in layout of articles and the like in a store, it is expected that the accuracy of estimation is improved by updating estimation parameters by relearning. For example, an average of face directions per hour can be the statistic of face images.

Figure 27:
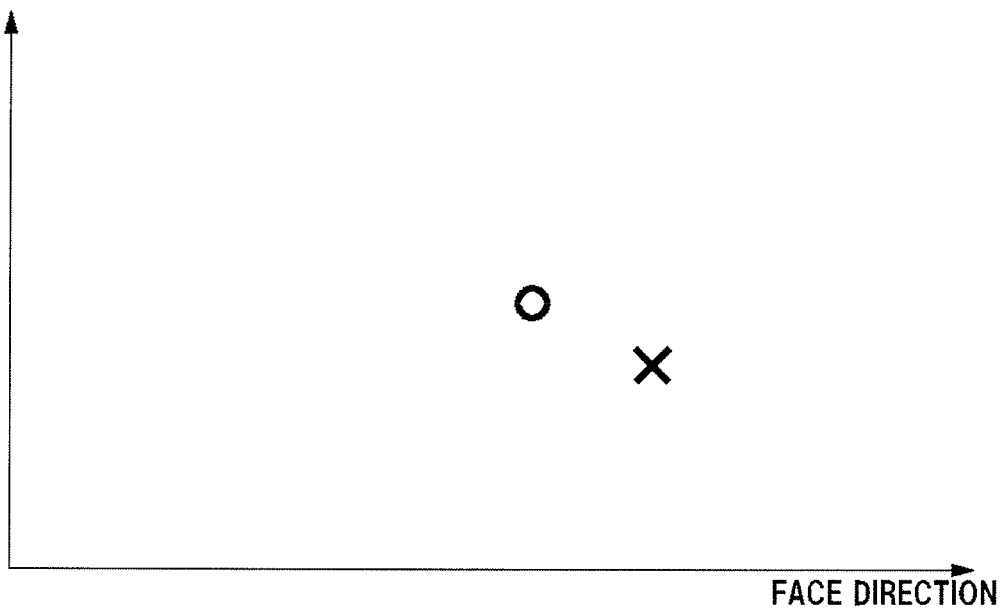
FIG. 27 is a diagram showing an environment-dependent attribute space in the variation embodiment of the present invention.
Figure 28:
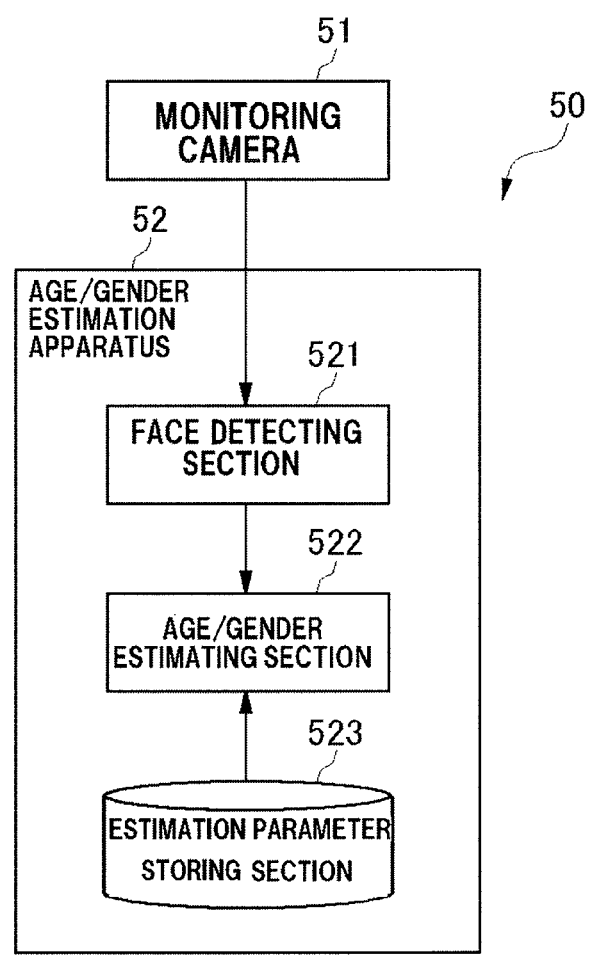
FIG. 28 is a diagram showing the configuration of a conventional human attribute estimation system.

FIG. 27 is a diagram showing an environment-dependent attribute space. When difference between an average of learning images (indicated by "O" in the figure) and an average of face images taken within the last one hour (indicated by "X" in the figure) is a predetermined threshold or above in an environment-dependent attribute space as shown in FIG. 27, the necessity-of-relearning judging section also judges that relearning is necessary.

(Other Examples of Environment-dependent Attribute)

In the above embodiments, a face direction and a face feature have been described as examples of an environment-dependent attribute. Instead of or in addition to these, the environment-dependent attribute may be, for example, the brightness of a photographing position, the direction of a light source or the resolution of a face area in an image. In the case of estimating an environment-dependent attribute, the brightness of a photographing position can be estimated, for example, by a brightness histogram of an image taken by a monitoring camera. The direction of a light source can be estimated by analyzing an image taken by a monitoring camera. The resolution of a face area can be estimated by the size of a face area detected by the face detecting section.

Furthermore, the environment-dependent attribute may be an attribute dependent on the specifications of a monitoring camera. The attribute dependent on the specifications of a monitoring camera is, for example, a bit rate at which an image is transferred from the monitoring camera to an age/gender estimation apparatus. In the case of estimating the environment-dependent attribute, the bit rate can be estimated by acquiring information about it from the monitoring camera.

(Selection of Age/Gender Estimation System from which Learning Data is to be Provided)

In the first and second embodiments, if a request for learning data is issued from a certain age/gender estimation system to other age/gender estimation systems, and multiple other age/gender estimation systems have learning data corresponding to the request, learning data may be acquired from an age/gender estimation system with a high estimation accuracy (correct answer rate). The estimation accuracy of each age/gender estimation system can be determined, for example, by inputting correct answer information for an image taken by the age/gender estimation system and comparing it with an actual estimation result.

(Composition of Face Images Having Different Environment-Dependent Attributes)

At the time of generating estimation parameters on the basis of learning images in the parameter distribution servers 33 or 43 in the third or fourth embodiments, it is possible, for example, to compose a face image directed 15 degrees rightward from a face facing front, which is given correct answer information. This variation is effective when there are not enough relearning images. As for such a face image generated by composition, it is not necessary to give correct answer information again, and, therefore, the burden of the learning data collection work for generating estimation parameters can be reduced.

(Guide for Inputting Correct Answer)

There may be a case where, at the time of generating learning data by causing the user to input correct answer information, learning data of a part of generations is lacking. In such a case, the correct answer inputting section may present a face image estimated by the age/gender estimating section to be a face of the generation the learning data of which is lacking to the user to prompt him to input correct answer information. By doing this, data of all generations can be acquired as learning data without omission.

(Restriction of the Number of Learning Data)

In the above embodiments, learning accuracy is improved by reinforcing learning data having an environment-dependent attribute close to the environment-dependent attribute of each store to update estimation parameters. However, if the learning data to be reinforced is concentrated in a certain generation, it may happen that, by reinforcing such learning data to update estimation parameters, the estimation accuracy for the other generations decreases.

Therefore, if generations are not balanced in the learning data to be reinforced, weightings may be given to learning data according to the number of learning data of each generation in order to reduce such imbalance.

(Other Variations)

In the above first embodiment, learning data used at the time of generating initial estimation parameters is not stored in the learning data storing section 132, and, at the time of relearning, the relearning is performed with the use of only learning data acquired from another age/gender estimation system. However, in the first embodiment also, it is possible to store the learning data at the time of generating the initial estimation parameters in the learning data storing section 132 and, at the time of performing relearning, perform the relearning using the learning data at the time of generating the initial estimation parameters together with the learning data acquired from another age/gender estimation system, similarly to the second embodiment.

In the above embodiments, initial estimation parameters are stored in the estimation parameters storing section when an age/gender estimation apparatus is manufactured and shipped, and the age/gender estimation apparatus is configured such that age and gender can be estimated immediately after installation without adopting the present invention and performing relearning. However, the initial estimation parameters may not be stored when the age/gender estimation apparatus is manufactured and shipped. In this case, estimation parameters are generated by utilizing the present invention and performing relearning, and operation can be started.

In the above embodiments, the description has been made with age and gender taken as attributes of a human. However, only any one of age and gender may be estimated. Other attributes may be attributes of a human according to purposes. For example, a ethnicity (Caucasoid, Negroid, Mongoloid or the like) may be an attribute of a human.

In the above third and fourth embodiments, the parameter distribution server may configured by a group of PCs in which multiple server PCs (humanal computers) are collected. In this case, functions of cloud computing, such as allocating and storing individual data into appropriate PCs to reduce the load of the whole parameter distribution server, are incorporated.

In the above embodiments, the monitoring camera is installed near the entrance of a store. However, the monitoring camera may be installed, for example, near a cash register to photograph the face of a customer who pays the price.

While the currently conceivable, preferred embodiments of the present invention have been described above, various variations and modifications can be made to the above embodiments, and it is intended that all such variations and modifications within the spirit of truth and the scope of the present invention are included by the attached claims.

INDUSTRIAL APPLICABILITY

As described above, the present invention can improve the estimation accuracy irrespective of an environment-dependent attribute, and it is effective as a human attribute estimation system and the like for estimating an attribute of a human from an image of the human using estimation parameters based on learning.

REFERENCE SIGNS LIST 10, 20, 30, 40, 50 age/gender estimation system
11, 21, 31, 41, 51 monitoring camera
12, 22, 32, 42, 52 age/gender estimation apparatus
121, 221, 321, 421, 521 face detecting section
122, 222, 322, 422, 522 age/gender estimating section
123, 223, 323, 423, 523 estimation parameter storing section
124, 424 environment-dependent attribute specifying section
224, 324 environment-dependent attribute estimating section
125, 225, 325 correct answer inputting section
326 learning data storing section
327 representative learning data extracting section
328, 428 acquisition/provision section
329, 429 communication section
13, 23 relearning control server
33, 43 parameter distribution server
131, 231, 331 relearning section
132, 232, 332 learning data storing section
133, 233 learning data acquiring/providing section
333 relearning controlling section
433 estimation parameter providing section
134, 234, 334, 434 communication section
235, 335 clustering section
236, 336 environment-dependent attribute comparing section
337, 437 estimation parameter accumulating section

The invention claimed is:

1. A human attribute estimation system being communicably connected to an other human attribute estimation system comprising a second camera, the human attribute estimation system comprising:
a first camera photographing a human target of attribute estimation and generating an image, the first camera being installed at a predetermined place;
an attribute estimating section estimating an attribute of the human shown in the image generated by the first camera using an estimation parameter;
an environment-dependent attribute estimating section estimating a first environment-dependent attribute, which is an attribute dependent on an installation environment of the first camera, from test learning data which includes multiple test face images each of which is taken in a state that the first camera is installed at the predetermined place;
an environment-dependent attribute comparing section comparing an environment-dependent attribute of initial learning data used at the time of generating the estimation parameter with an environment-dependent attribute of the test learning data to send a request for external learning data to the other human attribute estimation system, the external learning data having a distribution of an environment-dependent attribute which does not exist in the initial learning data and exists in the test learning data; and
a learning data acquiring section acquiring the external learning data from the other human attribute estimation system via communication, the external learning data being generated using images photographed by the second camera which installation environment is similar to that of the first camera and having a second environment-dependent attribute which is close to the first environment-dependent attribute, so that it meets a predetermined criteria, wherein
the attribute estimating section uses a parameter being updated by relearning on a basis of data including the initial learning data and the external learning data, as the estimation parameter.

2. A human attribute estimation apparatus connected to a first camera and an other human attribute estimation apparatus comprising a second camera, the first camera and the second camera being installed at a predetermine place and photographing a human targeted by attribute estimation and generating an image, the human attribute estimation apparatus comprising:
an attribute estimating section estimating an attribute of the human shown in the image generated by the camera using an estimation parameter;
an environment-dependent attribute comparing section comparing an environment-dependent attribute of initial learning data used at the time of generating the estimation parameter with an environment-dependent attribute of the test learning data to send a request for external learning data to the other human attribute estimation system, the external learning data having a distribution of an environment-dependent attribute which does not exist in the initial learning data and exists in the test learning data; and
an environment-dependent attribute estimating section estimating a first environment-dependent attribute, which is an attribute dependent on an installation environment of the camera, from test learning data which includes multiple test face images each of which is taken in a state that the camera is installed at the predetermined place; and
a learning data acquiring section acquiring the external learning data from the other human attribute estimation system via communication, the external learning data being generated using images photographed by the second camera which installation environment is similar to that of the first camera and having a second environment-dependent attribute which is close to the first environment attribute, so that it meets a predetermined criteria, wherein
the attribute estimating section uses a parameter being updated by relearning on a basis of data including the initial learning data and the external learning data, as the estimation parameter.

3. A human attribute estimation method comprising:
photographing a human targeted by attribute estimation and generating an image, using a first camera which is installed at a predetermined place;

estimating an attribute of the human shown in the image generated by the photographing using an estimation parameter; and estimating a first environment-dependent attribute, which is an attribute dependent on an installation environment of the camera, from test learning data which includes multiple test face images each of which is taken in a state that the camera is installed at the predetermined place;

comparing an environment-dependent attribute of initial learning data used at the time of generating the estimation parameter with an environment-dependent attribute of the test learning data to send a request for external learning data which has a distribution of an environment-dependent attribute which does not exist in the initial learning data and exists in the test learning data; and acquiring the external learning data from an other human attribute estimation system comprising a second camera via communication, the external learning data being generated using images photographed by the second camera which installation environment is similar to that of the first camera and having a second environment-dependent attribute which is close to the first environment attribute, so that it meet a predetermined criteria, wherein the estimating uses a parameter being updated by relearning on a basis of data including the initial learning data and the external learning data, as the estimation parameter.

4. The human attribute estimation system according to claim 1, wherein when the request for the external learning data is sent and multiple other human attribute estimation systems have learning data corresponding to the request, the external learning data is acquired from one of the other human attribute estimation system with the highest estimation accuracy.

5. The human attribute estimation system according to claim 1, further comprising:

an answer input section receiving input of answer for age and gender about the test face image as answer information to store the answer information, together with the corresponding test face image and the environment-dependent attribute estimated for the corresponding test face image, to a learning data storing section as the test learning data, wherein when the answer information is received from a user and the external learning data of a part of generation is lacking, the correct answer inputting section represents the test face image estimated by using the estimation parameter to be a face of the generation the learning data of which is lacking to the user to prompt him/her to input correct answer information.

* * * * *